(12) United States Patent
Rodriguez Bravo et al.

(10) Patent No.: US 11,127,071 B2
(45) Date of Patent: Sep. 21, 2021

(54) DRONE STATION MARKETPLACE

(71) Applicant: International Business Machines Corporation, Armonk, NY (US)

(72) Inventors: Cesar Augusto Rodriguez Bravo, Alajuela (CR); Jesse Mendez Monge, Alajuela (CR); Romelia Flores, Keller, TX (US)

(73) Assignee: International Business Machines Corporation, Armonk, NY (US)

( * ) Notice: Subject to any disclaimer, the term of this patent is extended or adjusted under 35 U.S.C. 154(b) by 222 days.

(21) Appl. No.: 16/132,531

(22) Filed: Sep. 17, 2018

(65) Prior Publication Data

US 2020/0090255 A1     Mar. 19, 2020

(51) Int. Cl.

| | |
|---|---|
| G06Q 30/00 | (2012.01) |
| G06Q 30/06 | (2012.01) |
| G05D 1/08 | (2006.01) |
| G01W 1/02 | (2006.01) |
| G01W 1/10 | (2006.01) |
| G06F 16/23 | (2019.01) |

(52) U.S. Cl.
CPC ......... *G06Q 30/0641* (2013.01); *G01W 1/02* (2013.01); *G01W 1/10* (2013.01); *G05D 1/0808* (2013.01); *G06F 16/2379* (2019.01)

(58) Field of Classification Search
None
See application file for complete search history.

(56) References Cited

U.S. PATENT DOCUMENTS

| | | |
|---|---|---|
| 9,056,676 B1 | 6/2015 | Wang |
| 9,387,928 B1 | 7/2016 | Gentry et al. |
| 9,471,059 B1 | 10/2016 | Wilkins |
| 2007/0090937 A1 | 4/2007 | Stabler |
| 2015/0379874 A1 | 12/2015 | Ubhi et al. |
| 2016/0306355 A1* | 10/2016 | Gordon ................. G08G 5/006 |
| 2016/0307449 A1 | 10/2016 | Gordon et al. |
| 2016/0357183 A1 | 12/2016 | Shaw |
| 2017/0123421 A1* | 5/2017 | Kentley ................ G08G 1/202 |
| 2017/0154536 A1* | 6/2017 | Kreiner ................. G06Q 10/00 |

(Continued)

OTHER PUBLICATIONS

Arjun Kharpal, "Amazon wants to use lampposts, churches as drone 'perches'", cnbc.com, [Accessed Online Sep. 14, 2018] https://www.cnbc.com/2016/07/19/amazon-wants-to-use-lampposts-churches-as-drone-perches.html.

(Continued)

*Primary Examiner* — Mila Airapetian
(74) *Attorney, Agent, or Firm* — Patterson + Sheridan, LLP

(57) ABSTRACT

Drone marketplaces for utilizing one or more drone functionalities. A method includes a computer-implemented method which includes: populating a drone marketplace database for a drone marketplace with drone information, scoring the plurality of drones of the drone marketplace based on the performance drone information, receiving a rating of a drone performance from one or more drone engagers, receiving a request for a drone service from the one or more drone engagers, analyzing the drone information, continuously updating, the drone marketplace database with the drone information, dispatching a first drone of the plurality of drones to perform the requested service, based on the drone information.

20 Claims, 12 Drawing Sheets

(56) References Cited

U.S. PATENT DOCUMENTS

2019/0056726 A1* 2/2019 Weldemariam ......... G10L 15/22
2020/0286392 A1* 9/2020 Miller ................ G06Q 10/0836

OTHER PUBLICATIONS

Kelsey D. Atherton, "Amazon Patent Lets Drones Perch on Streetlight Recharging Stations," Popular Science, [Accessed Online Sep. 14, 2018] https://www.popsci.com/amazon-patent-puts-drones-on-streetlight-recharging-stations.
Martha DeGrasse, "Amazon sees cell towers as drone charging stations," rcrwireless.com [Accessed Online Sep. 14, 2018] https://www.rcrwireless.com/20160725/network-infrastructure/drone-charging-on-cell-towers-tag4.
Skysence—High Power Drone Charging Pad and Infrastructure [Accessed Online Sep. 14, 2018] https://www.skysense.co/.

* cited by examiner

DRONE STATION MARKETPLACE

BACKGROUND

The present invention generally relates to drones, including unmanned aerial vehicles (UAV), and more specifically to a drone or UAV marketplace and an interface for the same selection of drones and for facilitating drone selection.

UAVs, sometimes referred to as drones, are used for a variety of activities, such as surveying remote and/or expansive areas, e.g., power lines, pipelines, and wetlands, etc. More recently, the prospect of utilizing UAVs for distributing services has been explored, e.g., in a commercial setting to provide supplies, other needed items, or services in support of non-commercial operations, e.g. access areas that may be difficult to reach by other types of transportation or provide a service in a more expedient manner than might otherwise be available. In both the non-commercial and commercial setting, users of drone services and administrators of drone services may not be able to select services according to specific needs and conditions or provide any input to influence the selection process of a drone service. Such lack of specificity and input from user/users can lead to reduced efficiency of the drone service and specificity of service for a user.

SUMMARY

Accordingly, there is a need to provide systems and methods for efficient deployment of UAVs which includes input from one or more users. Such a system and method can include h user and administrator preferences.

The present disclosure provides methods and systems for drone selection, including embodiments that employ one or more factors to facilitate the selection. The factors include specific user preferences, user reviews and feedback, performance metrics and scores determined under specific external conditions, and performance metrics of other drones with similar physical characteristics under similar conditions and for similar services.

One embodiment of the present disclosure includes a computer simulated drone marketplace system that includes: a plurality of interfaces each for displaying at least one drone feature associated with one or more drones to a drone user, a first one of the plurality of interfaces coordinating with a feedback mechanism for determining i) a performance level of one or more drones in providing one or more services along at least one route under one or more external conditions and ii) displaying one or more results of the determined performance level of the one or more drones in providing the one or more services to the drone user.

One embodiment of the present disclosure includes a computer-implemented method for creating a drone station marketplace for using drone services between users. The computer implemented method includes: populating a drone marketplace database for a drone marketplace using one or more feedback modules with information related to drone performance for a plurality of drones as part of the drone marketplace, the information related to the drone performance including preference information from a plurality of drone engagers, receiving a rating of a performance of at least one of the plurality of drones as part of the information related to drone performance from the plurality of drone engagers, scoring the plurality of drones of the drone marketplace based on a plurality of factors as part of the information related to drone performance, the factors including performance threshold, receiving a request for a drone service from a drone engager of the plurality of drone engagers, where the request includes preference information of the drone engagers, analyzing the preference information and the information related to drone performance for each of the plurality of drones, continuously updating, with the one or more feedback modules, the drone marketplace database with the drone performance information, and dispatching a first drone of the plurality of drones to perform the requested service, based on the information related to the drone performance, including the scoring of the plurality of drone and the rating by the plurality of drone engagers, and the drone preference information of the plurality drone engager.

A computer program product for utilizing one or more drone functionalities, the computer program product including: a computer-readable storage medium having computer-readable program code embodied therewith, the computer-readable program code executable by one or more computer processors to: populate a drone marketplace database for a drone marketplace using one or more feedback modules with information related to drone performance for a plurality of drones as part of the drone marketplace, the information related to the drone performance including preference information from a plurality of drone engagers, receive a rating of a performance of at least one of the plurality of drones as part of the information related to drone performance from the plurality of drone engagers, score the plurality of drones of the drone marketplace based on a plurality of factors as part of the information related to drone performance, the factors including performance thresholds, receive a request for a drone service from a drone engager of the plurality of drone engagers, where the request includes preference information of the drone engager, analyze the preference information and the information related to drone performance for each of the plurality of drones, continuously update, with the one or more feedback modules, the drone marketplace database with the drone performance information, and dispatch a first drone of the plurality of drones to perform the requested service, based on the information related to the drone performance, including the scoring of the plurality of drone and the rating by the plurality of drone engagers, and the drone preference information of the plurality drone engagers.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. The term "module" and "component" is used interchangeably herein.

Embodiments described herein can be utilized for one or more drones, including one type of drone which is an unmanned aerial vehicle (UAV). Many drone, e.g. UAVs, systems and solutions have several limitations, including an inability to provide users with the ability to make an informed selection based on a particular need, incorporating feedback and analytic techniques to gauge different drone and UAV performances for a particular service under similar conditions to predict future performance, and an interface that automatically and seamlessly enables users to access one or more drones, e.g. UAVs, and one or more drones, e.g. UAVs, for one or more drone, e.g. UAV, services. According to at least one embodiment, a drone, e.g. UAV, market interface permits users to select at least one drone, e.g. UAV, by presenting performance and physical metrics associated with the at least one drone, e.g. UAV, to the users. Embodiments of the present disclosure addresses these and other technical issues associated with drones and/or UAVs and services associated therewith.

Figure 1:
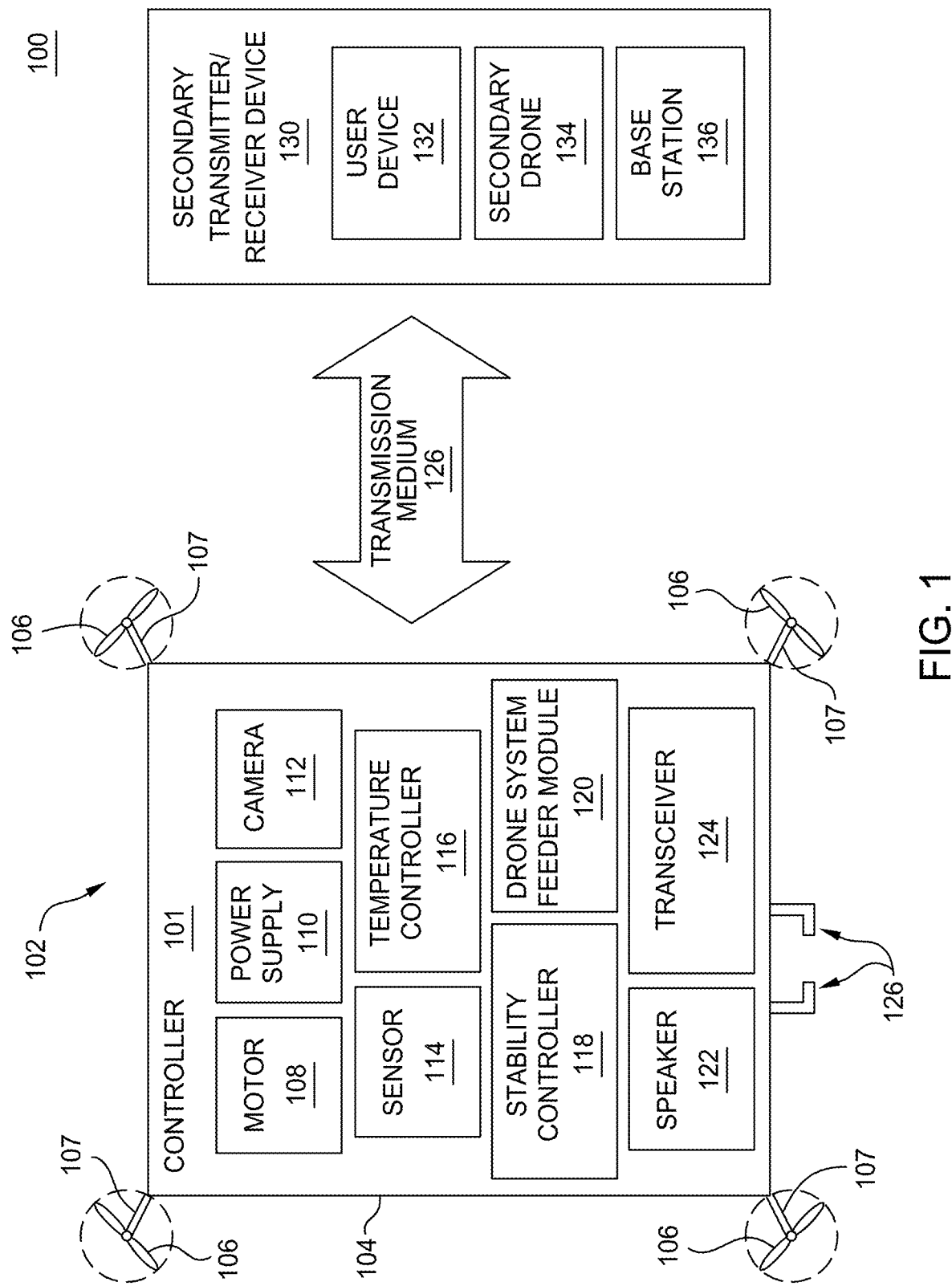
FIG. 1 illustrates a drone capable of providing drone services and useful with an embodiment of the present discourse.

FIG. 1 illustrates an exemplary system 100 for aerial transportation of delivery items using a drone 102 or provision of services by a drone.

Advancements in drones have been implemented for delivery services consumer goods or for the provision of other services, e.g. recreational activities, recordings of events, etc. For example, a delivery drone, also known as a parcelcopter, may transport packages, food, medicines, and other goods with delivery times much faster than traditional transportation methods. In addition, drones used for delivery services also enable delivery of such goods to remote locations that are difficult to get to by traditional transportation methods due to varying terrain on such delivery routes.

The drone 102 may include a housing 104, at least one movement mechanism 106, and a motor 108. The components of the drone 102 may be affixed on the outside of the housing 104, or alternatively, may be enclosed within the housing 104 of the drone 102.

The movement mechanism 106 may include a single propeller, a plurality of propellers, or similarly functioning devices to provide aerial movement for the drone 102. In one embodiment, the at least one movement mechanism may be powered by at least one motor 108, such as a gasoline engine, electric motor and/or a power supply 110 to provide movement for the drone 102. The power supply 110 may include a battery, such as a rechargeable battery, and/or solar powered battery sufficient for powering the drone 102 and/or components of the drone 102.

The movement mechanism(s) 106 may be placed at any desired location on the drone 102, such that the placement of the movement mechanism(s) 106 does not interfere with each other or with another component positioned on the drone 102 and/or housing 104. In one embodiment, the movement mechanism 106 is positioned on at least one extension arm 107 such that the extension arm 107 connects the movement mechanism 106 to the housing 104.

In one or more embodiments, the movement mechanism 106 and/or extension arm(s) 107 are spaced around the drone 102 and/or positioned such that the drone 102 maintains a balanced orientation. A balanced orientation may be a state of equilibrium in which the drone 102 may enable an efficient flight. In one or more embodiments, the position of the at least one movement mechanism 106 and/or extension arm(s) 107 may be adjusted such that the drone 102 maintains a balanced orientation. For example, the movement mechanism(s) 106 and/or extension arm(s) 107 may pivot and/or hinge from the housing 104 of the drone 102 in various directions. In one or more embodiments, the position of the extension arms 107 may be adjusted and/or repositioned when the drone 102 carries a delivery item (not shown) via attachment device 126 to maintain a balanced orientation.

In one embodiment, the movement mechanism 106 and/or motor 108 provides aerial movement for the drone 102 in multiple degrees of freedom. Multiple degrees of freedom generally refers to the ability for the drone 102 to move in a three-dimensional space. Specifically, the movement mechanism 106 and/or motor 108 may be controlled by controller 101 to move the drone 102 along three perpendicular axes, namely forward/backward movement, up/down movement, and left/right movement. In addition, the controller 101 may control the movement of the drone in 360 degree rotation, tilting forward/backward movement (e.g., pitching), swiveling left/right movement (e.g., yawing), and pivoting side to side movement (e.g., rolling).

In one embodiment, the movement mechanism(s) 106 and/or motor 108 provides movement for the drone 102 to deliver one or more items or provide a particular service to a particular destination. For example, the movement mechanisms 106 and/or motor 108 may enable the drone 102 to aerially transport delivery items or provide one or more services from a shipping/dispatch location to a particular delivery destination, such as a consumer's location and/or shipping address. In one or more embodiments, the movement mechanism 106 and/or motor 108 may provide aerial movement to the drone 102 to base stations, e.g. drone stations, recharging stations, shipment facilities, and/or locations of other drones to, for example, recharge the power supply 110. In yet a further embodiment, the movement mechanism(s) 106 and/or motor 108 provides movement for the drone 102 to avoid collision between the drone 102 and an object, such as a person, tree, building, and/or other structures.

In one or more embodiments, the attachment device 126 fastens a delivery item (not shown) to the drone 102. The attachment device 126 may include, but is not limited to, a latch, a hook or claw, a suction device, a magnetic device, or combination thereof, and/or any other device capable of temporarily attaching (e.g., fastening) the delivery item to the drone 102 and releasing (e.g., unfastening) the delivery item upon delivery. In an embodiment, the attachment device 126 may include a retractable wire which may be permanently attached to the housing 104 at one end and, at the other end, may include a hook, latch, or further accessory to connect the delivery item to the wire and/or drone 102.

In one or more embodiments, the attachment device 126 may include a compartment and/or enclosure to store the delivery item on the drone 102 until delivery. The compartment may be integrated with the drone 102 and/or may be attached to the drone 102. In one or more embodiments, the compartment and/or enclosure may be temperature controlled by one or more sensors 114 and/or a temperature controller 116 to, for example, provide protection to perishable items, such as foods, medicines, life-forms (e.g., plants, animals), etc. In a further embodiment, the attachment device 126 (e.g., compartment) may be thermally insulated. For example, the attachment device 126 may include insulating material within the compartment.

The drone 102 can engage and/or deploy the attachment device 126. For example, the drone 102 may close a latching device so as to "lock" a delivery item to the drone 102. In addition, the drone 102 may open the latching device so as to release the delivery item upon delivery. In one or more embodiments, the drone 102 may be configured to deploy the retractable wire to a sufficient height above the ground to enable safe delivery of the delivery item.

The drone 102 may further include a controller 101 that controls one or more components of the drone 102. For example, the controller 101 may control at least one camera 112, at least one sensor 114, a temperature controller 116, a stability controller 118, a drone or UAV marketplace system feeder module 120 (referred to interchangeably as "feeder module 120" or "module 120"), an audio device for receiving and transmitting sound 122, e.g. an audio device with a recorder and/or audio device, and/or a transceiver device 124. (The term "component" and the term 'module" is used interchangeably herein).

Figure 3:
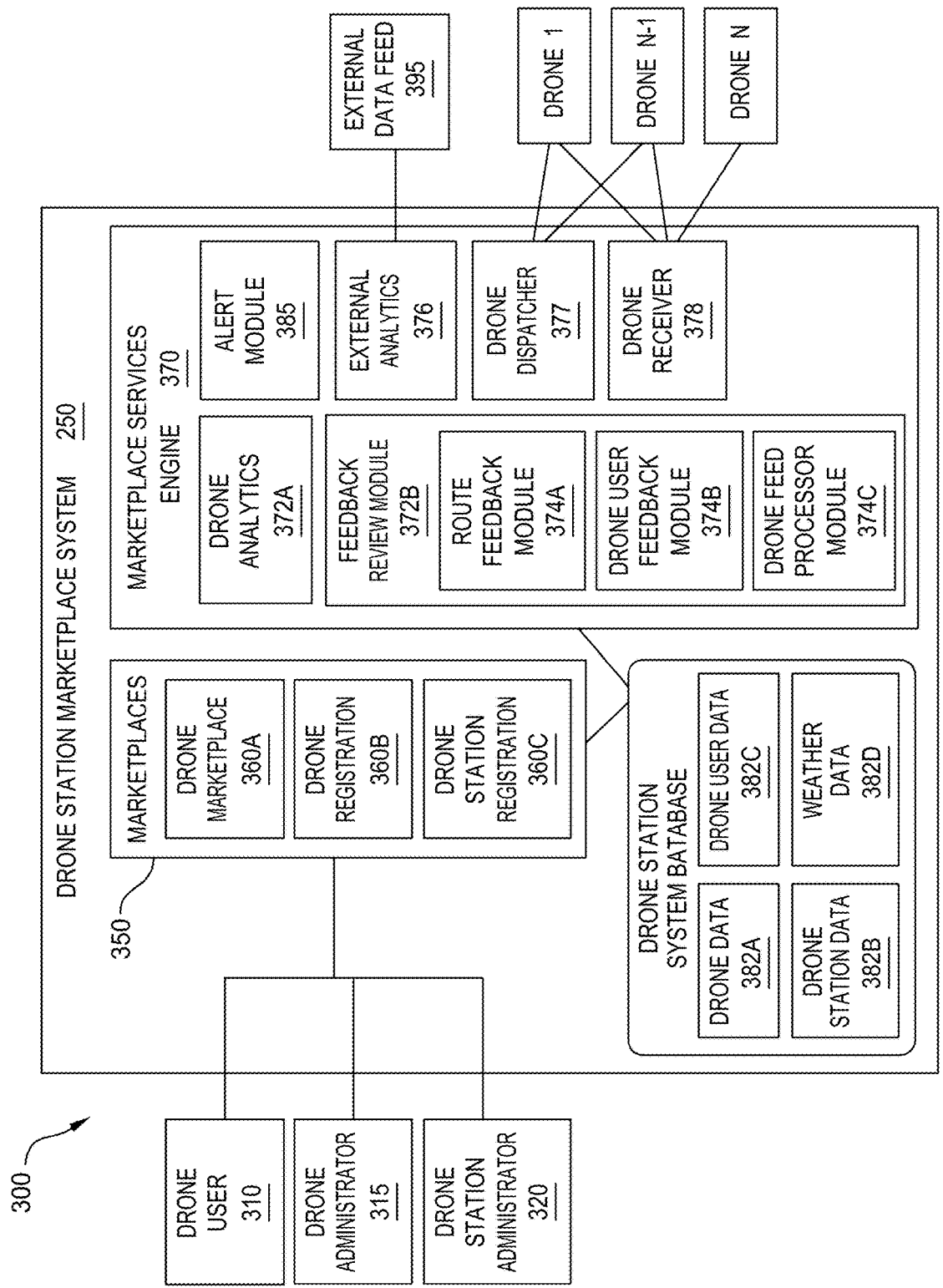
FIG. 3 illustrates a UAV marketplace system for facilitating performance of at least one drone service in accordance with at least one embodiment of the present disclosure.

The drone 102 may include a drone marketplace system feeder module 120 for providing information, data, and analytics to a drone marketplace (described in greater detail in FIG. 3). As discussed in greater detail below, the drone marketplace system feeder module 120 can be a suitable software and/or hardware computer module for receiving one or more of drone performance information or data, drone environmental information, drone physical information, drone station information and any other type of information that is relevant to a drone's ability to provide services and/or deliver goods to a user from one or more components of the drone or the environment traveled by the drone. The feeder module 120 provides this data to one or more components of a drone marketplace system, as described below, which in turn assists a user in making a proper selection of a drone unit, drone station, and/or drone service.

The camera 112 may be configured to provide and/or receive visual feedback, such as one or more still images and/or video feedback, to the drone 102 and/or an operator (e.g., user) wirelessly controlling the drone 102. For example, the camera 112 may provide visual feedback of obstacles in the path of the drone 102 for any purpose, such as, but not limited to, navigation guidance to the drone 102. In a further embodiment, the controller 101, utilizing information from the camera 112, may determine a safe location for the drone 102 to land and/or disengage the attachment device 126 to deliver the item. The camera 112 may capture one or more still images or video images and, the controller 101 using a database, may perform image comparison with database images, such as drone station system database 380 of FIG. 3, to determine whether or not the location is safe to land and/or release the delivery item. For example, the camera 112 may capture an image of a rooftop of a building and, the controller 101 using image comparison, may identify the rooftop as an unsafe location to release the delivery. It should be understood that various types of cameras are contemplated, including high-definition cameras, night-vision enabled cameras, infrared sensing cameras, X-ray imaging devices, line scan imaging devices, etc.

In a further embodiment, the camera 112 may be configured to take one or more still images and/or video upon delivery of an item. For example, when the drone 102 delivers an item at a destination location, the camera 112 may capture a photo and/or video of the released delivery item at the delivery location and/or the location itself to confirm delivery and/or location of such item. The drone 102 may provide delivery notification and/or delivery location information to the recipient by transmitting the photo and/or video to a user device 132 (e.g., a mobile device, tablet, computing device, etc.) via transceiver 124 and/or transmission medium 128. Accordingly, the recipient can confirm the time and/or actual location where the delivery item was physically delivered.

The camera 112 may be placed on the drone 102 such that the camera may provide visual feedback in 360 degrees on a horizontal plane and/or 360 degrees on a vertical plane of the drone 102. In one or more embodiments, the camera 112 may include a plurality of cameras to provide visual feedback in all directions surrounding the drone 102 such that there are no obscurations of the visual field (e.g., blind spots). In one or more embodiments, the camera 112 may be embedded within the housing 104 so as to prevent any negative effects to aerodynamics of the drone 102.

The camera 112 can be further configured to take images of a base station 136 (referred to as "base station," "drone station," and "station" interchangeably herein) that services the drone 102. In one embodiment, the camera 112 can include a timer (or it can coordinate with another timing mechanism located on the drone 102) to time the occurrence of events at the station 136, e.g. the time to repair a drone under specific weather conditions, for a particular route, for a particular deliver or service, etc. This information can be provided to drone marketplace system feeder module 120, which can process it and feed into a drone marketplace system, e.g. as shown in FIG. 3.

The information recorded by the camera can be processed into data suitable for an analytics engine to assess the performance of the drone 102 (as described further in reference to FIG. 3). For example, the performance of the drone in relation to providing a service, e.g. recording of an event, delivery of a particular item or material, or provision of fuel to a fueling station for one or more automobiles, in light of specific obstacles along a route can be recorded and provided to the drone marketplace system feeder module 120 for data processing, where the drone marketplace system feeder module 120 feeds the data to one or more modules of a drone marketplace system, as discussed below, can be data for processing by analytics. All of the information depicted above, which the camera records, including delivery times, obstacle handling, feedback from users, etc. can be provided to the drone marketplace system feeder module 120 for processing. As discussed in further detail below, the various analytics processing concerning drone performance, route processing, feedback analysis, or otherwise can be performed by any suitable analytics engine capable of providing the necessary functionality as indicated.

In an embodiment, the drone 102 may include at least one sensor 114. The sensor 114 may include, but is not limited to, an acoustic sensor (e.g., microphone), a chemical sensor, an infrared sensor, an optical sensor, a collision avoidance sensor (e.g., a proximity sensor), a heat/temperature sensor, a gravitation force sensor (e.g., accelerometer), a speed sensor (e.g., airspeed indicator), tilt sensor, etc.

In an embodiment, the sensor 114 may be configured to detect one or more environmental variables, such as temperature, acceleration, (e.g., changes in acceleration), tilt angle, cumulative turbulence, wind resistance, exposure to sunlight, oxygen levels, pressure (e.g., atmospheric pressure), humidity, etc., associated with the drone 102 and/or traversed during flight, which may be displayed on and/or generated by the drone marketplace system feeder module 120 to one or more individuals (e.g., an observer, recipient, etc.), as will be described in further detail. It should be understood that the term "environmental variables" should not be limited and may include other variables detected by sensor 114 and/or experienced by a drone 102 during flight.

In an embodiment, detecting temperatures experienced and/or traversed during flight may determine, for example, assessment of risk to a perishable object during flight and/or upon delivery of such object. In a further embodiment, the sensor 114 may detect one or more environmental variables (e.g., temperature) during flight.

In one or more embodiments, the sensor 114 may be configured to detect various environmental variables traversed by the drone 102 during flight including, but not limited to, acceleration, and/or percentage of tilt. The detected level of acceleration, and/or tilt may be displayed on the drone marketplace system feeder module 120 to, for example, assess overall flight environment and/or issue a command to the stability controller 118 to provide a more stable flight environment where acceleration, tilt and/or orientation are critical, such as during the delivery of animals or fragile items.

The drone marketplace system feeder module 120 can receive information and data associated with performance of the drone based on one or more environmental factors discussed above and convert it into data, including but not limited to weather data, which is similarly processed as discussed above. As with the camera 112, in one embodiment, the one or more sensors 114 can be configured to assess the environmental factors and other factors outlined above as they relate to a drone 102 being serviced at a base or drone station 136, in addition to containing a timing mechanism for obtaining information on how physical parameters relate to time. For example, temperature fluctuations at a station 136 when a drone is being serviced and contains perishable goods, or temperature variations for extended periods of times due to the physical makeup of a particular drone and in relation to the environmental factors the drone encounters.

The stability controller 118 may be configured to determine appropriate load distribution of the delivery item(s) such that the load is balanced and/or evenly displaced based on the measurements detected by the sensor 114 prior to flight. In one or more embodiments, the stability controller 118 receives dimension and/or weight information of each delivery item and arrange the delivery item(s) along the drone 102 to maintain a balanced load for an efficient flight.

In a further embodiment, the sensor 114 may be configured to detect proximity to objects and/or obstacles in the path of the drone 102 for any purpose such as, but not limited to, navigation guidance to the drone 102. In one or more embodiments, the sensor 114 may be configured to determine a distance between the drone 102 and a detected object to avoid collision.

The drone marketplace system feeder module 120 may provide additional details about the drone 102, station 136 and/or delivery item(s) using a suitable analytics engine from the information and data collected as described above or otherwise preconfigured into the drone marketplace system feeder module 120. For example, the drone marketplace system feeder module 120 may generate a dollar value associated with the delivery item(s), which may change during the course of delivery. In one or more embodiments, the dollar value or viability of the delivery item(s) may change throughout the delivery if, for example, the delivery item(s) are perishable, which may be indicated by the drone marketplace system feeder module 120. The dollar value of the delivery item may decrease when one or more environmental variables exceed a predetermined threshold. For example, when a detected temperature is above melting point, a delivery item (e.g. ice cream) may melt, and the value of the delivery item may decrease. The drone marketplace system feeder module 120 may indicate the change in dollar value of such delivery item.

In one or more embodiments, the drone marketplace system feeder module 120 provides the recipient of the delivery item with an up-to-date estimated time of delivery or it can provide the estimation to a marketplace system as described in FIG. 3, which can then be presented to an appropriate user by request or otherwise as may be desired. For example, the drone marketplace system feeder module 120, in combination with a navigation unit, such as navigation 404 of FIG. 4, may estimate time of delivery based on approximate distance to the delivery location and/or velocity (e.g., airspeed) of the drone 102. The estimated time of delivery determined by the drone marketplace system feeder module 120 may be transmitted and/or otherwise communicated to the recipient, such as a user device 132, via the transceiver 124 and/or transmission medium 128. In addition, the user device 132 may prompt/request the drone marketplace system feeder module 120 to provide updated information associated with the drone 102 including, but not limited to, estimated time and/or date of delivery.

In an embodiment, the drone marketplace system feeder module 120 may provide the recipient with delivery notification, such as delivery of the item and/or a percentage of order fulfillment (e.g., 50%, 1 out of 2, etc.) when multiple deliveries are expected. Accordingly, the recipient of the delivery item(s) may better estimate when delivery is expected and arrange to be present for delivery so as to prevent theft of the delivery item(s) upon delivery. In addition, the drone marketplace system feeder module 120 may indicate and/or display which part of an order is being delivered when, for example, orders are split into several packages and/or several deliveries (e.g., among multiple drones).

In one or more embodiments, the drone marketplace system feeder module 120 may indicate a total amount of time spent traveling from the shipping location and/or a battery recharging station to the delivery location. Determining the total amount of time spent traveling may be used, for example, to assess a level of risk to perishable items and/or the battery life of the power supply 110. For example, the drone marketplace system feeder module 120 may track and/or display a total amount of time spent traveling with a perishable delivery item.

The secondary drone 134, which can also be a UAV, and/or base station 136 may provide services, e.g. power recharging and/or replacement power supply services, to the drone 102 or otherwise make the drone suitable for flight and/or performance. For example, the secondary drone 134 may recharge the power supply 110 on the drone 102 during flight and/or automatically replace the power supply 110 by removing, using a replacement mechanism, the depleted power supply 110 and inserting a charged power supply 110. The base station 136 may include, but is not limited to, a shipment facility and/or a battery-charging station located at various locations, including a homeowner's property. In one or more embodiments, the base station 136 may be fully automated to replace and/or recharge the power supply 110. In other embodiments, the base station 136 may utilize the assistance of the property owner where the base station 136 is located. For example, the property owner may initiate operation of the base station 136 to cause a replacement mechanism to remove the depleted power supply 110 and insert another power supply 110. In one or more embodiments, drone marketplace system feeder module 120 can be configured to receive and process information from one or more of the other drone modules, e.g. the camera 112, the sensor 114, etc. on the performance of the particular station, e.g. 136, in rendering the services mentioned in this paragraph, and then provide that information to a suitable marketplace system, e.g. as provided for in FIG. 3.

Although not expressly shown in the figures, base or drone stations, e.g. 136, can also include sensor, image capturing, audio, or other collecting data devices that collect information relevant for the performance of the base or drone stations, drones, and/or how externalities can affect the stations and/or the drones and can transmit the information the drone system market place of FIG. 3.

Figure 2:
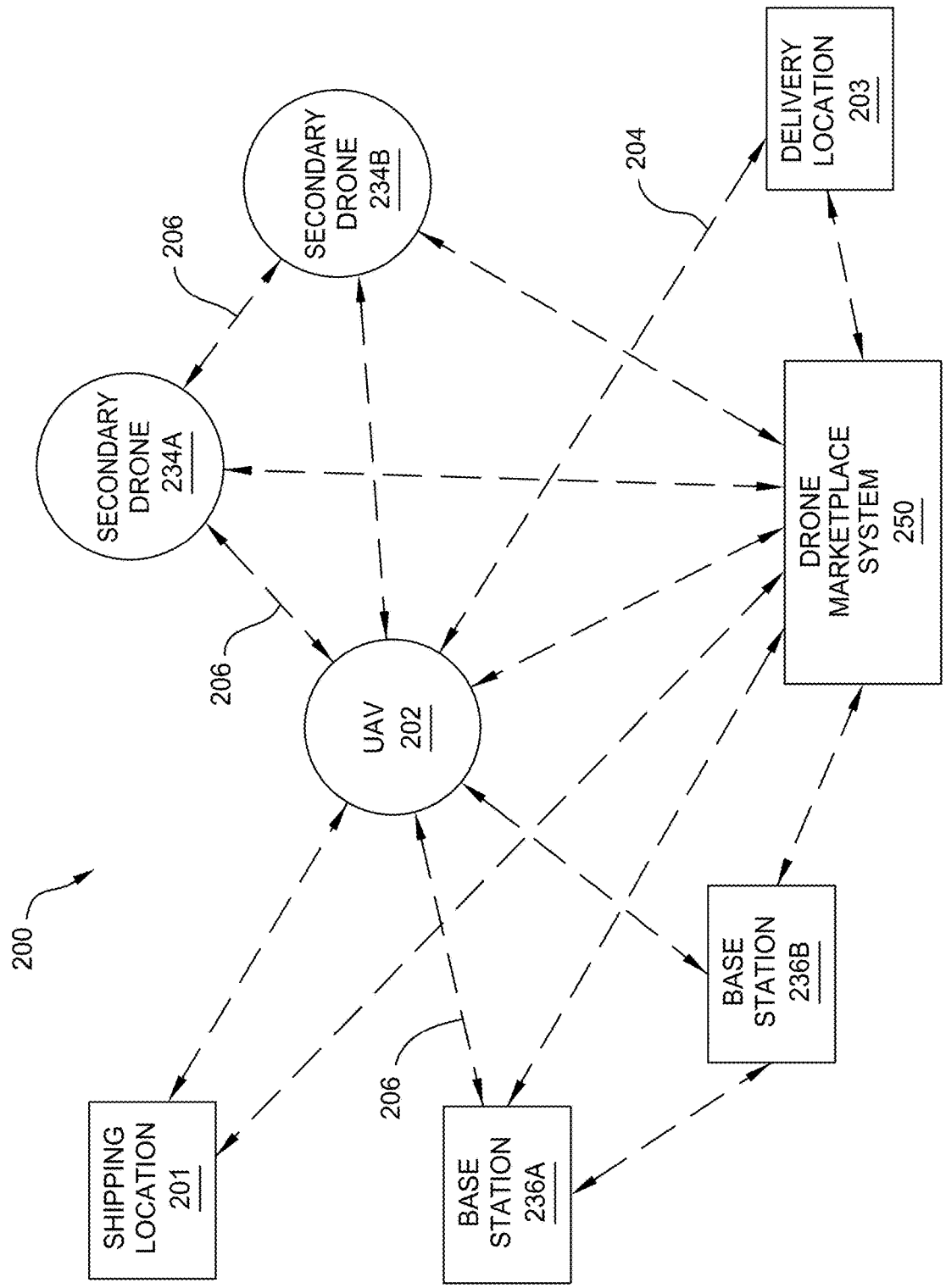
FIG. 2 illustrates a system for performing distributed package transport services useful with an embodiment of the present discourse.

FIG. 2 illustrates a high level view of a system 200 for performing distributed package transport services useful with an embodiment of the present discourse. The drone or UAV 202 may include any of system 100 of FIG. 1. As illustratively depicted in FIG. 2, the drone 202 may be traveling to and from shipping location 201 and delivery location 203 along delivery route 204. In one or more embodiments, the drone 202 may be configured to communicate 206 with one or more secondary drones 234A, 234B, which can also be UAVs, and/or one or more base stations 236A, 236B within the vicinity of the drone 202. In one or more embodiments, the drone 202 may transmit a power level to secondary drones 234A, 234B and/or base stations 236A, and 236B and/or request availability of recharging services. In one or more embodiments, the requests from drone 202 may have different weighted values depending on, for example, perishability of the items attached to the drone 202, progress towards the delivery location 203 and/or shipping location 201, etc. For example, a request for recharging services may be higher from a drone 202 carrying a perishable delivery item versus drone 202 carrying a non-perishable item. In one embodiment, each of the secondary drones 234A, 234B can be configured as in system 100, and can include a marketplace system feeder module 120 for collecting data on the performance of drone 202 under different conditions. One or more components of system 200, as shown FIG. 2, including drone 202, interface with drone marketplace system 250, which is described in greater detail with respect to FIG. 2. The one or more components, including drone 202, provide and receive information to drone marketplace system 250 and receive control instructions from drone marketplace system 250.

FIG. 3 illustrates a more detailed overview of the UAV or drone marketplace system 250, which includes one or more software or hardware components configured to perform one or more specific tasks related to the provision of drone services. The drone marketplace system 250 can interface with one or more drone users 310, one or more drone administrators 315, and/or one or more drone station administrators 320 (drone users, drone administrators, and drone station administrators being collectively referred to as "drone engagers"). A drone user 310 (referred to as "drone user" and "user" interchangeably herein) can be an automated system or human user that utilizes one or more drones, e.g. 102, 102n-1, 102n, etc. and/or one or more drone stations, e.g. 136, for moving cargo from one location to another, for powering drones, dispatching station services, or for other kinds of drone services.

A drone administrator 315 can be a system or human individual who owns a drone and provides characteristics of their drone(s) to the drone marketplace system 250. A drone station administrator 320 can be an individual or system that owns drone stations and the services available at one or more stations. The interfacing can be done directly using any suitable computer device or module part of the system or using a separate computer system or portion associated therewith, including the system shown in FIG. 7.

The drone marketplace system 250 includes a marketplace component 350 with one or more interfaces 360A, 360B, and 360C, where the interfaces 360A, 360B, and 360C can be powered by one or more analytics engines and visible on any suitable graphic user display of a computer or mobile device. In one embodiment, the interface 360A can be an interface 360A configured for a drone user's 310 use. The drone user interface 360A being capable of displaying maps of drones and drone station services to enable a drone user 310 to select or shop for one or more distinct drones, select or shop for one or more distinct drone stations, select or shop for one or more distinct drone station or drone services, create routing plans and/or ensure appropriate fee exchanges/charges. In one embodiment, the interface 360B can be a drone administrator interface 360B that can permit one or more drone administrators 315 to publish information or display information that can be used in the drone marketplace component 350 to visualize who is using a drone, drone services associated with a drone or drone user account information associated with a drone. In one embodiment, the interface 360C can be an interface for a drone station administrator that can permit one or more drone station administrators 320 to publish information or display information that can be processed in the drone marketplace component 350 to visualize who is utilizing a drone station, drone services associated with a drone station, or drone user account information associated with a drone station. In one embodiment, the interfaces 360A, 360B, and 360C can be components of a single interface and in another embodiment they can be distinct interfaces. In one embodiment, each interface 360A, 360B, and 360C can be divided into more than one interface, for example, 360A can be divided into two interfaces, one for selecting drones and one for selecting drone services.

The drone marketplace system 250 can further include a marketplace services analytics engine 370, which can include one or more analytics engines for providing relevant information and guidance for selecting or assessing a drone, drone service, and/or drone station via the interfaces 360A, 360B, and 360C, of the drones user(s) 310, drone administrator(s) 315, and drone station administrator(s) 320. In one embodiment, the marketplace services analytics engine 370 can include a drone analytics component 372A, which can create a route based on origin/destination and travel preferences (distance, type of view, type of route, drone score, weather, etc.) selected by a user. The drone analytics component 372A obtains information and/or instruction from one or more components internal to the marketplace services analytics engine 370, such as the feedback review module 372B (described in further detail below), drone system database 380 (also described below), or an external data feed 395 (as discussed below). After the analytics component 372A receives the relevant information and/or instruction, the drone analytics component 372A, based on a request from the drone users 310, drone administrators 315, and/or one or more drone station administrators 320 and via the relevant interface, e.g. 360A, 360B, and/or 360C, can provide information related to selecting available stations, route efficiency tips, and/or drone availability for a particular destination, and can suggest and generate a relevant route for a particular destination. In one embodiment, the drone analytics component 372A can communicate with a controller 101 to instruct a drone 102 to take a particular flight path, where in one embodiment the user selects a path suggested by drone analytics component 372A and in another embodiment a user selects an option on a suitable interface, e.g. 360A, to automatically allow component 372A to set the path based on one or more analytics determinations.

In one embodiment, the drone marketplace system 250 includes a drone station system database 380, which can include drone data 382A, drone station data 382B, drone user data 382C, and external data (e.g. weather data) 382D. The drone station system database 380 can receive data from the one or more drone users 310, one or more drone administrators 315, and/or one or more drone station administrators 320. The drone data 382A contains, for each drone, information related to models/type, services/capabilities, scores in association to services, realtime location, etc. The drone station data 382B contains, for each drone station, services offered by a particular station, scores associated with that station, costs associated with that station, location of the station availability, etc. The drone user data 382C includes, for each user and administrator, preferences, account information, or any other information relevant in a user and administrator making a drone services selection. The external data 382D includes information about external factors that can affect route and servicing requests, including but not limited to weather data and location data. The drone station system database 380 can be updated by the individual drones, e.g. 102 with a drone marketplace system feeder module 120, from an external feed 395 (discussed below), from the individual stations, e.g. 136, or from feedback provided by the one or more of a drone users 310, drone administrators 315 and/or drone station administrators 320.

In one embodiment, drone marketplace system 250 includes a separate analytics component, e.g. an external analytics component or module 399, that performs analysis and forecasting for the external data feed 395, e.g. an external analytics module 399 for processing past, present, and forecast data. The external analytics component 399 can coordinate with the drone analytics component 372A to provide route guidance and selection services based on the processing of the external data, e.g. the external analytics component 399 can use and process realtime weather data feed to analyze data pattern changes and their impact on drone routes for effective drone dispatching and readjusting.

In one embodiment, the drone analytics component 372A can take into account drone station scores/rates/services as well as drone scores/rates/services to suggest the best possible routes and rates for a particular service. In one embodiment, the drone analytics component 372A generates relevant scores for a drone or drone station by comparing performance under similar conditions, e.g. how long did it take for one drone to arrive at a particular destination and render a particular service when weather conditions were substantially similar and both drones took the same route and were serviced at the same drone station. Different scores can be associated with different services, and the scores and underlying information can be presented to a user, e.g. 310, via an appropriate interface, e.g. 360A. Similarly, in one embodiment, a drone station can receive a score based on how drones with substantially similar scores and/or physical parameters perform under substantially similar conditions, when serviced at that station in relation to another station, and this information can also be presented to a user, e.g. 310, via an appropriate interface, e.g. 360B.

In one embodiment, the feedback review module 372B, including one or more modules (discussed below) of the feedback review module 372B, receives and processes input provided from various sources concerning the performance of a drone or drone station and can coordinate with the drone analytics module 372A to update or formulate route suggestions for a user. The feedback review module 372B can receive the information directly from a drone, e.g. 102, 102n. For example, the drone marketplace system feeder module 120 can provide data received from a camera 112, temperature controller 116, etc. and process it to assess drone 102 or drone station 136 performance, which can then be applied to a subsequent service provided by the same or similar drone or drone station for a same or similar service under the same or similar conditions. The information can be provided by affirmative feedback entered into drone station drone station system database 380 by one or more of the drone users 310, drone administrators 315, and/or drone station administrators 320. For example, a drone user may enter information indicating he or she was satisfied or dissatisfied by the performance of a particular drone, e.g. 102, providing a particular service, and he or she may indicate the reason, e.g. timeliness, and drone analytics component 372A will query drone station system database 380 to adjust the score accordingly, which can then be applied to a subsequent service provided by the same or similar drone for a same or similar service under the same or similar conditions.

In one embodiment, the drone feedback module 372B includes a route feedback module 374A, which can continuously update the drone station system database 380 with information corresponding to routing information received from a component involved with route calculation, e.g. a drone analytics component 372A. In one embodiment, the drone feedback module 372B includes a drone user feedback model 374B, where the drone user feedback module 374B can receive drone analytic information, which can also be received from the drone analytics component 372A, and where the drone analytic information can include at least one preference of at least one of the drone users 310.

In one embodiment, the drone feedback module 372B includes a drone feed processor module 374C that can receive realtime data from one or more drones 102 via the UAV marketplace system feeder module 120, where the real time performance can include the performance of a drone 102, or one drone in relation to another drone, with respect to drone services provided i) at a particular location, ii) under a particular temperature range, iii) with a certain weight load attached to the one or more drones, and/or iv) a speed range achieved by the one or more drones at the location, with the certain weight load, and under the particular temperature range. This information can be processed by the drone feedback module 372B and incorporated by the analytics components 372A to make a suggestion to a user as to a particular route for a particular drone service. The drone feed processor module 374C can also receive similar information from a drone station with respect to the drone 102, and also with respect to a drone station's, alone or in relation to another station, capacity to service a drone 102 for providing a particular service i) at a particular location, ii) under a particular temperature range, iii) with a certain weight load attached to the one or more drones, and/or iv) a speed range achieved by the one or more drones at the location, with the certain weight load, and under the particular temperature range. Similarly, the drone station feedback can also be processed by the drone feedback module 372B to enable a suggestion for one or more routes to a user for a particular service. The drone feeder module 374C can also store the data it acquires and the processing results associated therewith in one or more databases, e.g. 382A, 382B, etc. and/or share the data with another module of the market place system, e.g. 372A.

The drone feed processor module 374C can receive both drone data and drone station data with respect to past and present services of a drone 102 at a particular drone station and invoicing and cost data associated with using a particular drone 102 and/or drone station 132. A user 310 can set an acceptable bandwidth of cost or servicing parameter when making a request and the drone analytics component 372A, in coordination with one or more other modules and components, including the route feedback module 374A, the drone feed processor module 374C and the drone user feedback module 374B, can take cost and servicing into account when making a route suggestion to a user for a particular drone service. The drone feed processor module 374C can also store the servicing data and invoicing data in one or more databases, e.g. 382A, 382B, etc., which can then be displayed to a drone administrator, drone station administrator or user via an appropriate interface, e.g. 360A, 360B, 360C, etc.

In one embodiment, the drone marketplace system 250 includes an alert module 385 that can detect changes in routes and weather patterns. The alert module 385 can provide alerts to be displayed via one the drone marketplace interfaces 360A, 360B, and 360C to a drone user 310, drone administrator 315 and/or drone station administrator 320. Furthermore, the alert module 385 can update drone station system database 380 as external conditions change and/or it can coordinate with drone analytics component 372A and feedback review module 372B to suggest to a user or administrator that a route, drone or servicing station along a route be substituted as a result of the external conditions, e.g. changes in weather make a selected drone unsuitable for the requested service made by a user.

In one embodiment, the drone marketplace system 250 includes an external feed 395 which supplies information directly to drone station system database 380 and can be a tool database or system, such as a weather feed, that monitors externalities that can affect one or more performance metrics of a drone or drone stations, e.g. a realtime weather data feed with location information enabling the weather analytics for the drone analytics component 372A and, as necessary, the feedback review module 372B. The external feed 395 can include a weather monitoring and analytics component for monitoring the weather and storing weather past weather data, current weather data and weather forecast data in the drone station system database 380.

In one embodiment, the drone marketplace system 250 includes a drone dispatcher 377 that receives requests for services provided by a drone station at the request of a user, e.g. 310, where the dispatcher is responsible for dispatching the particular type of drone as selected by the user, e.g. an audio, video, patrol, cargo, or other type of drone, and a receiver 378 that can supply real-time information regarding drone locations. Both the dispatcher 377 and the receiver 378 can coordinate with other components of the drone marketplace system 250, e.g. the feedback module 372B, the alert module 385 and the drone analytics component 372A, to provide and process real-time updates of changing conditions, and in one embodiment, the coordination can allow the drone marketplace system 250 to facilitate route alterations, provide delay estimates, etc.

In one embodiment, in addition to cost and/or servicing options, a user 310, via one or more interfaces, e.g. 360A, can make a selection under one or more specific needs, including drone brand, drone autonomy and fuel efficiency, a particular technical prowess of a drone, e.g. camera resolution or audio capabilities, cargo space, and/or other user feedback. Similarly, the user 310 can make similar selections with respect to a drone station, e.g. tailor the service according to cargo space of a station, servicing options of a station, location of the station, power capacities of a station, maintenance capacities of a station, and/or other user feedback of a station. In one embodiment, the user 310 can also see flight and use history for a particular drone or drone station via one or more interfaces, e.g. 360A, and can make a selection based on the same. The user can make a firm selection as to one or more of these features, and the drone user feedback module 374B will ensure routing options without a drone or drone station capable of rendering those features. In one embodiment, the user 310 can instead assign a preference score to one or more features, and the drone user feedback module 374B can coordinate with module 374A to adjust routing options accordingly.

In one embodiment, the information discussed above in the preceding three paragraphs can also be made available to a drone administrator 315 or drone station administrator 320 via an appropriate interface, e.g. 360A, so that the drone administrator and drone station administrator can make decisions, e.g. maintenance decisions concerning drones and/or drone stations. Additional information that can be made available to a drone station administrator and/or a drone administrator include scheduled services for one or more drones, messages from users and/or a maintenance crew concerning one or more drones or drone stations, invoices for drones or drone stations, drone and drone station availability, cargo settings for drones and for drone stations, an interface to search for specific drones, power management for one or more drones and/or drone stations, user feedback for drones and/or drone stations, available spacing for incoming drones or outgoing drones, and an interface to disable features for one or more drones or to indicate one or more drone services are not available.

In one embodiment, the drone station administrator and/or drone administrator can communicate with one or more modules of feedback module 372B to affect route calculation and route suggestions presented to a user, e.g. if a drone administrator indicates a particular drone is not available for a particular service that corresponds to a service aligned with a user request (or similarly for a drone station), then the options presented to the user will be adjusted accordingly.

Figure 4:
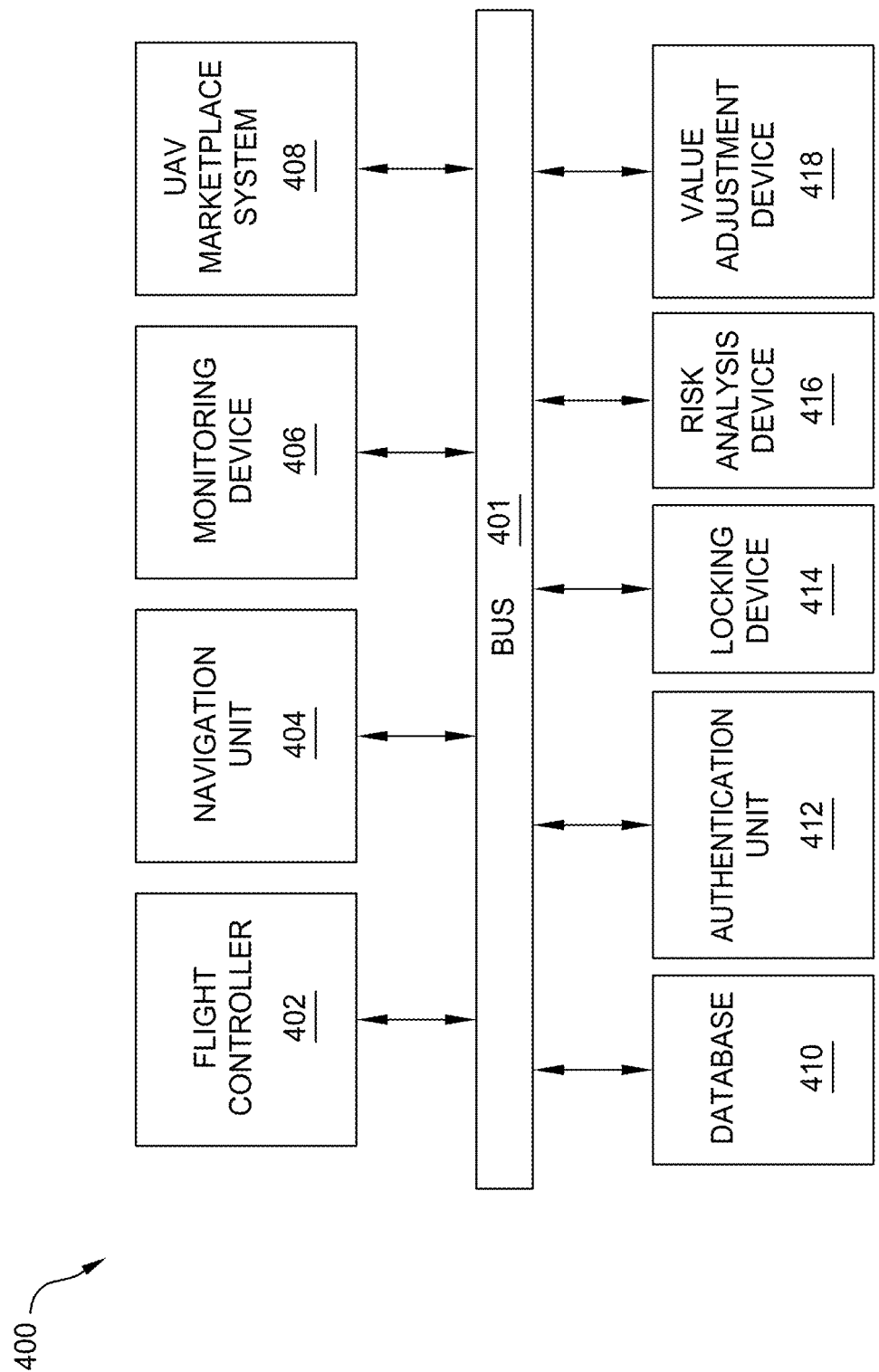
FIG. 4 illustrates an exemplary processing system for aerial transportation of delivery items or providing services using a UAV, in accordance with at least one embodiment of the present disclosure.

It is to be appreciated that system 400 described below with respect to FIG. 4, is a system for implementing respective embodiments of the present disclosure. Further, it is to be appreciated that one or more processing systems in 100, 200, 400 and/or 700 may perform at least part of the method described herein, including, for example, at least part of method 500A, 500B, 600A, 600B, and 600C of FIGS. 5A, 5B, 6A, 6B, and 6C respectively.

Referring now to FIG. 4, with continued reference to FIG. 1, an exemplary system 400 for aerial transportation of delivery items using a drone 102 is shown, in accordance with an embodiment of the present disclosure. The system 400 includes a flight controller 402, a navigation unit 404, a monitoring device 406, a drone marketplace system 408, a database 410, an authentication unit 412, a locking device 414, a risk analysis device 416 and/or a value adjustment device 418.

The flight controller 402 may be configured to control movement of the drone 102. In one embodiment, the flight controller 402 may include a motor, such as motor 108 in FIG. 1. In one or more embodiments, the flight controller 402 may control the aerial movement of the drone 102 by controlling the at least one movement mechanism 106 and/or motor 108 illustrated in FIG. 1. For example, the flight controller 402 may control aerial movement of the drone 102 by sending control signals to the at least one movement mechanism 106 and/or motor 108 to maintain a level flight.

In an embodiment, the flight controller 402 may be configured to control movement of the drone 102 by controlling the rotational speed(s) and/or rotational direction(s) of each of the movement mechanisms 106 independently and/or collectively. For example, the flight controller 402 may be configured to rotate each of the movement mechanisms 106 in a single direction, or alternatively, the flight controller 402 may be configured to rotate each of the movement mechanisms 106 in opposing directions. In one embodiment, the flight controller 402 may be configured to control movement of the drone 102 to avoid collision between the drone 102 and various obstacles (e.g., trees, mountains, etc.).

In a further embodiment, the system 400 may include a navigation unit 404, such as a global positioning system (UPS). The navigation unit 404 may provide location information for particular shipping locations, delivery locations, and/or locations of one or more secondary devices 130, such as a user device 132, a secondary drone 134 and/or base station 136. Accordingly, the navigation unit 404 may provide the drone 102 with navigation coordinates of various locations, including relay locations where the secondary drone 134 and/or base station 136 can meet for power supply recharging and/or replacement. The navigation unit 404 may include map coordinates of a particular area and may provide such information to the flight controller 402, such that the flight controller 402 may direct the drone 102 to a particular location.

In an embodiment, the system 400 may include a monitoring device 406. The monitoring device 406 may include a camera, a sensor, a radar system, or similarly functioning devices. In one or more embodiments, the monitoring device 406 may be configured to perform one or more operations as described above in relation to the camera 110, sensor 114, temperature controller 116, and/or stability controller 118 of FIG. 1. For example, the monitoring device 406 may capture one or more still images or video images and, using database 410, may perform image comparison with database images to determine whether or not the location is safe to land and/or release a delivery item. In another embodiment, the monitoring device 406 may determine appropriate weight distribution of the delivery items along the drone 102.

The system may include an UAV or drone marketplace system 408. The drone marketplace system 408 may perform the operations as described above with reference to the drone marketplace system 250. In one or more embodiments, the drone marketplace system 408 may include one or more modules configured to provide one or more interfaces for a user to receive information concerning drone services and to make tailored selection of drone services. The one or more modules consider one or more environmental factors, performance data for drones and drone stations, and user preferences to provide a user with one or more suggestions on executing a drone service along a route, in addition to providing the ability to alter the selection or make adjustments along the route based on updated information, e.g. weather changes.

In an embodiment, the system 400 may include a database 410. The database 410 may be configured to store one or more still images or video images of buildings and/or landing areas, such as flat terrain, mailboxes, porches, etc. In one or more embodiments, the database 410 may provide such database images and/or video for image comparison with images and/or videos captured by the monitoring device 406. In a further embodiment, visual patterns and/or audible signals for the drone marketplace system 408 may be stored in database 410.

The authentication unit 412 may be configured to verify recipient information and/or delivery location for delivery of the item transported by the drone 102. In one or more embodiments, the authentication unit 412 may include a scanner, such as a biometric scanner (e.g., thumbprint reader, retinal scanner, etc.) and/or Radio-frequency identification (RFID) scanner, to verify a recipient in order to release the delivery item. In other embodiments, the authentication unit 412 may include a scanner configured to scan a barcode, such as a quick response code, provided by the recipient. For example, the recipient may provide a barcode on a user device, such as a cellular telephone and/or tablet, which the authentication unit 412 may scan to verify identification of the recipient. In one or more embodiments, the authentication unit 412 may include a user interface configured to receive a password input by the recipient. The authentication unit 412 may compare the input password with a stored password, such as a password stored in database 410, to verify the recipient. If the authentication unit 412 fails to correctly verify the recipient information, the authentication unit 412 may transmit a command to the flight controller 402 and/or navigation unit 404 to return to the shipment location. In one or more embodiments, the drone marketplace system feeder module 120 may indicate whether or not authentication has failed by, for example, visually displaying and/or announcing (e.g., via audio device 122) that authentication has failed.

In one or more embodiments, the system 400 may include a locking device 414. The locking device 414 may include, for example, electronic deadbolts and/or latches, a digital lock, an electronic lock, an electromagnetic lock, and/or similar functioning devices. The locking device 414 may be configured to "lock" the drone 102. For example, the locking device 414 may lock the delivery item to the attachment device 126 until authentication of the recipient is verified by the authentication unit 412. Accordingly, the drone 102 may be in a "locked mode" until the appropriate recipient supplies the appropriate unlock input (e.g., password, verification, validation, etc.) so as to prevent thievery of such delivery items and/or delivery to incorrect recipients. In one or more embodiments, the drone marketplace system 408 may indicate that the drone 102 is in a locked mode by, for example, illuminating one or more visual displays, generating an audible alarm, and/or providing an electronic signal indicating that the drone 102 is locked.

The risk analysis device 416 may be configured to evaluate a level of risk associated with one or more of the delivery items. In one or more embodiments, the risk analysis device 416 may determine a level of risk to delivery items that include perishable items. The risk analysis device 416 may determine whether or not a delivery item requires immediate attention upon delivery based on, for example, one or more environmental variables (e.g., an amount of travel time, temperatures traversed, and/or turbulence) experienced by the drone 102 during delivery. The risk analysis device 416 may be configured to provide the level of risk associated with the delivery item to the drone marketplace system 408 to, for example, indicate that the delivery item requires attention.

The system 400 may include a value adjustment device 418. The value adjustment device 418 may be configured to adjust the value of the delivery items depending on the risk level determined by, for example, the risk analysis device 416. For example, if the risk level to a perishable delivery item is high, the dollar value of the delivery item may be adjusted such that the value increases and/or decreases. As an example, if the delivery item is ice cream and the temperature sensor 114 determines that, during the delivery, the traversed temperature exceeds a threshold value, and then a dollar value and/or price charged for the ice cream may be reduced since the ice cream may be partially melted. Alternatively, the value adjustment device may increase the dollar value associated with the delivery item if a delivery is made early and/or arrives hot, such as a pizza being delivered to a home.

In the embodiment shown in FIG. 4, the elements thereof may be interconnected by a bus 401. However, in other embodiments, other types of connections can also be used. Moreover, in an embodiment, at least one of the elements of system 400 is processor-based. Further, while one or more elements may be shown as separate elements, in other embodiments these elements can be combined as one element. These and other variations of the elements of system 400 are readily determined by one of ordinary skill in the art, given the teachings of the present principles provided herein.

Figure 5A:
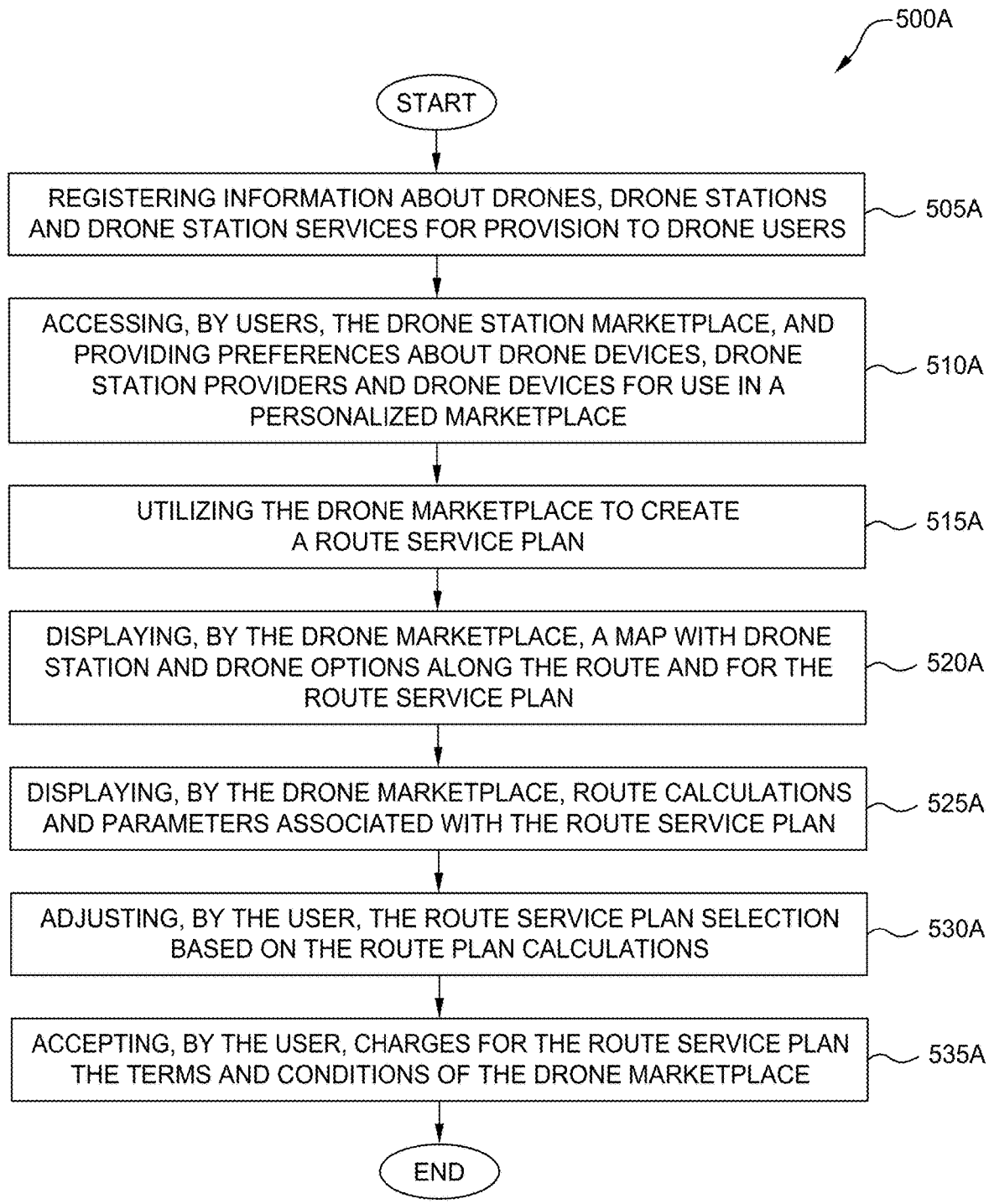
FIG. 5A illustrates a flow for providing UAV services in accordance with at least one embodiment of the present disclosure.

FIG. 5A illustrates a illustrates a flow 500A for providing UAV services in accordance with at least one embodiment of the present disclosure, e.g. the drone marketplace system 250 initializes a route execution for one or more users 310 using one or more drones 102, 102n. In one embodiment, as shown in block 505A, the drone user 310, the drone administrator 315 and drone station administrator 320 register information in the drone station system database 380 about the drones 102, 102n, on one or more drone stations, e.g. 136, and drone station services that the drones and stations can provide to the one or more users 310. The information associated with the drones, drone stations, and users includes but is not limited to the information discussed above with respect to the drone station system database 380.

In one embodiment, as shown in block 510A, the one or more drone users 310 accesses the drone marketplace system 250 via interface 360A and provides preferences about drone devices, drone station administrators and drone services they would like to utilize in the marketplace. This creates a personalized drone marketplace system 250 for the particular drone user 310, which is accessible by the interface 360A. In one embodiment, as shown in 515A, the drone user 310 can then use the interface 360A of the drone marketplace system 250 to commence the creation of a plan for a service. For example, a drone user 310 may want to move cargo from point A to point B and create a new plan that will contain the drone route to be executed.

In one embodiment, as shown in block 515A, the drone analytics component 372A creates and provides a route service plan for the user 310, which per block 520A, and via the interface 360A, is displayed as a map with one or more starting points and one or more ending points. The interface 360A also displays the variety of drones, e.g. 102, 102n, based in part on the drone user preferences, available to perform the particular task and associated drone stations available, also based in part on the drone user preferences.

In one embodiment, per block 525A, based on the information provided to the user 310, which can include performance scores for the drone(s) 102, 102n in relation to the particular service at issue, the frequency of use for the type of drone (for the particular service and generally), the performance of the drone under current weather conditions, the score for the drone station, etc., and based on this information, the user can adjust and select what is appropriate for the route plan, including begin and end dates for route execution.

In one embodiment, per block 530A, the drone marketplace system 250 can display route calculations (length of time, drone user charges, weather conditions, and other route metrics) to a particular drone user 310 via an appropriate interface 360A, and the drone analytics component 372A can provide more than one plan, including combinations of drones and drone stations and route variations, that the drone user 310 can consider to reduce length of time required to obtain the service they are requesting, including selecting other drone service stations providing cheaper rates or stations that avoid particular adverse predicted weather conditions. The drone user 310 selects and/or adjusts a selection based on the route plan calculations provided by the drone analytics component 372A and changes the selection(s) via the one or more interfaces of the drone marketplace system 250 in order to try to obtain the route of their final choice. Once the final selection is made, per block 535A, the drone user 310 accepts charges associated with the route plan via one or more interfaces and confirms acceptance by accepting terms & conditions specified at the interface 360A.

Figure 5B:
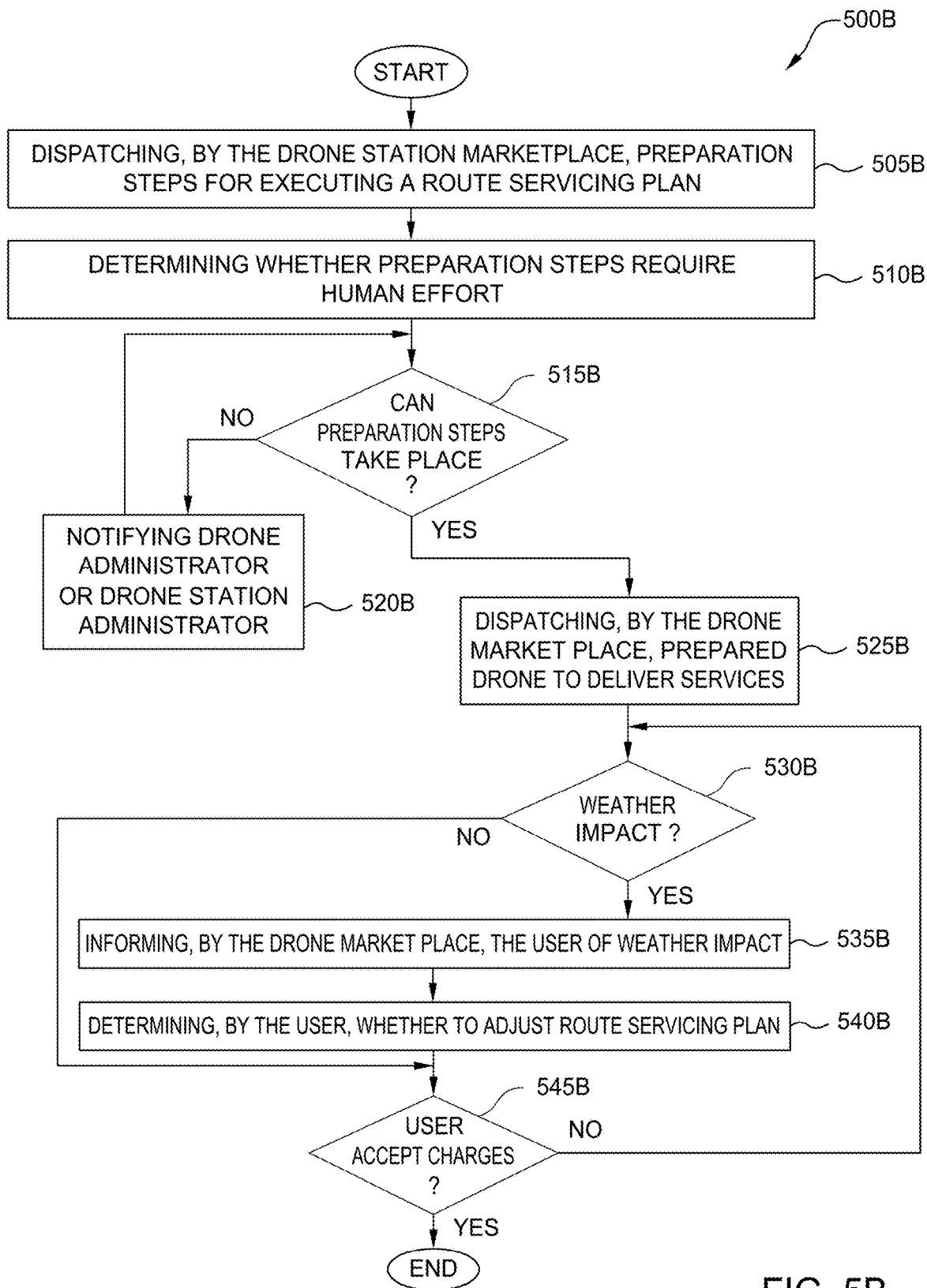
FIG. 5B illustrates a flow for providing UAV services in accordance with at least one embodiment of the present disclosure.

FIG. 5B illustrates a flow 500B for providing UAV services in accordance with at least one embodiment of the present disclosure. In one embodiment, per block 505B, once a drone user 310 has created and finalized a route plan for execution within the drone state marketplace 250 of a service to move cargo from Point A to Point B, the drone analytics component 372A can initiate preparations by coordinating with a drone controller 101 and other components, as dependent on the particular service, such as ensuring cargo and a specified drone with service capabilities, as selected by the user based on the feedback provided by the drone analytics component 372A, is available from the drone station 136 where a drone will be dispatched from.

In one embodiment, per block 510B, if any of the drone dispatch preparations require human/manual assistance an appropriate alert is sent to a drone administrator 315 or drone station administrator 320 by the alert module 385 to ensure they complete appropriate preparation actions. If for some reason all preparations cannot be completed, per block 515B, the drone administrator 315 or drone station administrator 320 can alert the drone user and ensure appropriate compensation is occurring with the drone user 310, as per block 520B. In one embodiment, the drone user can drop the plan if they are not satisfied with the service provided and can create a new plan with other drone service providers using the appropriate interface, e.g. 360A.

If no impediments exist or the impediments have been resolved, then per one embodiment and per block 525B, the drone dispatcher 397 dispatches the prepared drone to commence the delivery of the drone service for the drone user 310. In one embodiment, the drone marketplace system 250 receives real-time external updates, e.g. weather alerts from external feed 395 and the analytics module 372A predicts whether any route plans being executed will be impacted by changes in the weather. In one embodiment, per block 530B, a determination is made if the weather or other externalities will impact deliver of the drone services. If there is no impact, the route plan continues through execution to block 545B. If there is a route impact, then, per block 535B, one or more of the drone users 310 and drone administrators 315 are alerted as to the effects that the predicted weather can have on the drone services. The drone administrator 315 can react to the alert and can inform the drone user 310 if it is believed route adjustment is warranted or not, and/or indicate the impact, if any, to the service being provided.

In one embodiment, per block 540B, the user 310 can accept the risks or select a new route or make other adjustments, e.g. select a different drone, different station, etc. based on one or more recommendations provided by the drone analytics component 372A at the drone marketplace system 250 interface, e.g. 360A. Per block 545B, if the user accepts the terms and conditions presented at the interface 360A, then the original or modified route services plan is executed by the drone system marketplace 250. If the user does not accept the terms and conditions presented by the interface 360A, the drone marketplace system 250 and the user 310 can engage and functionalities may repeat until the service is completed, e.g. more than one alteration may occur due to changing weather conditions and/or the flow will revert back to block 530B.

Figure 6A:
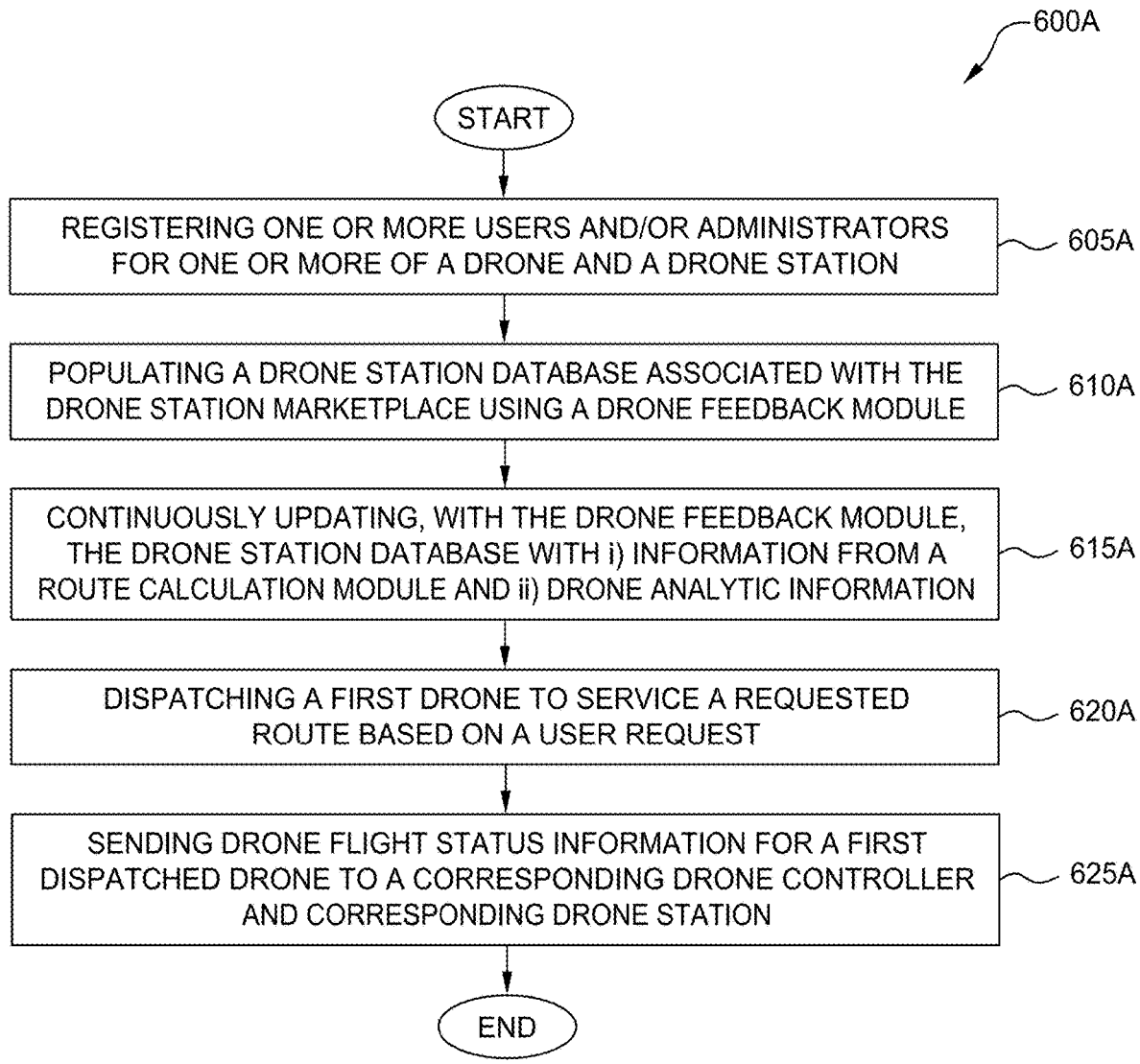
FIG. 6A illustrates a flow for providing UAV services in accordance with at least one embodiment of the present disclosure.

FIG. 6A illustrates a flow 600A for provision of one or more drone services in accordance with at least one embodiment of the present disclosure. In block 605A, one or more components and/or users of a drone marketplace system 250 will register one or more of i) drone users, ii) drone administrators, and iii) drone station administrators in a registry associated with the drone marketplace system 250. In one embodiment, one or more drone users 310, one or more drone administrators 315, and/or one or more drone station administrators 320 register themselves via an appropriate interface 360A, 360B, and 360C in the drone station system database 380. The registration can also include registering one or more of the users 310, drone administrators 315, and/or drone station administrators 320 to the marketplace for purposes of establishing a user profile and/or storing feedback information provided by the one or more users 310, drone administrators 315, and/or drone station administrators 320 with respect to preferences or drone and drone station performance.

In one embodiment, as shown in block 610A, a feedback review module 372B (including modules of a feedback review module 372B), in coordination with at least one other component of the drone marketplace system 250 will populate the drone station system database 380 with information about the one or more drone users 310, one or more drone administrators 315, and/or one or more drone station administrators 320, and information related to one or more of i) information related to drone or drone station performance, where the drone or drone station performance information includes scoring information related to the performance of a first drone in carrying out one or more drone services, where the scoring information is provided by at least one of a drone user 310, drone station administrator 320, or drone administrator 315, and where the scoring information is based on drone user 310, drone station administrator 320, or drone administrator 315 input or review of drone or drone station services under particular conditions, ii) drone data for one or more drones 102, 102$n$, iii) drone user data for one or more users 310, iv) drone station 136 data for one or more stations that can dispatch and/or service the one or more drones 102, 102$n$, and v) in coordination with the external analytics engine 399 (discussed below), weather data, where the weather data includes past weather data, current weather data and weather forecast data.

In one embodiment, per block 615A, the feedback module 372B can the drone station system database can continuously update the drone station system database with performance information related to drone or drone station performance. Also, per block 615A, and in one embodiment, the route feedback module 374A can continuously update the drone station system database 380 with information corresponding to routing information received from a route calculation module, e.g. a drone analytics component 372A and/or the drone analytics component 372A and/or one or more other components of the feedback review module 372B, e.g. 374B and 374C, and can continuously update the drone station system database 380 with drone user preferences.

In one embodiment, per block 620A, a drone user 310 or administrator 315, 320 can select a drone or drone station service for performing a service, and the drone dispatcher 377, in response to receiving a request associated with the selection, dispatches a first drone to service a route associated with the request (or dispatches the drone to be serviced at a particular station, if the request was related to serving the drone). In one embodiment, the selection and receiving request is based on the populating and continuous updating, e.g. the drone analytics component 372A will have presented options to the user 310 via the interface 360A that account for one or more of user preferences, weather data, performance data associated with the drones and drones stations, and other information that is relevant for providing a drone service along a specified route.

In one embodiment, per block 625A, the drone dispatcher 377 sends drone flight status information for a dispatched drone 102 to a corresponding drone controller, e.g. 101, and corresponding drone station, e.g. 136, and the drone dispatcher 377 coordinates with the drone receiver 378 and drone analytics component 372A to determine if the route should be updated based on real-time changes, e.g. weather changes that have been registered in the drone station system database 380 as adversely impacting drones of the type associated with the dispatched drone 102.

Figure 6B:
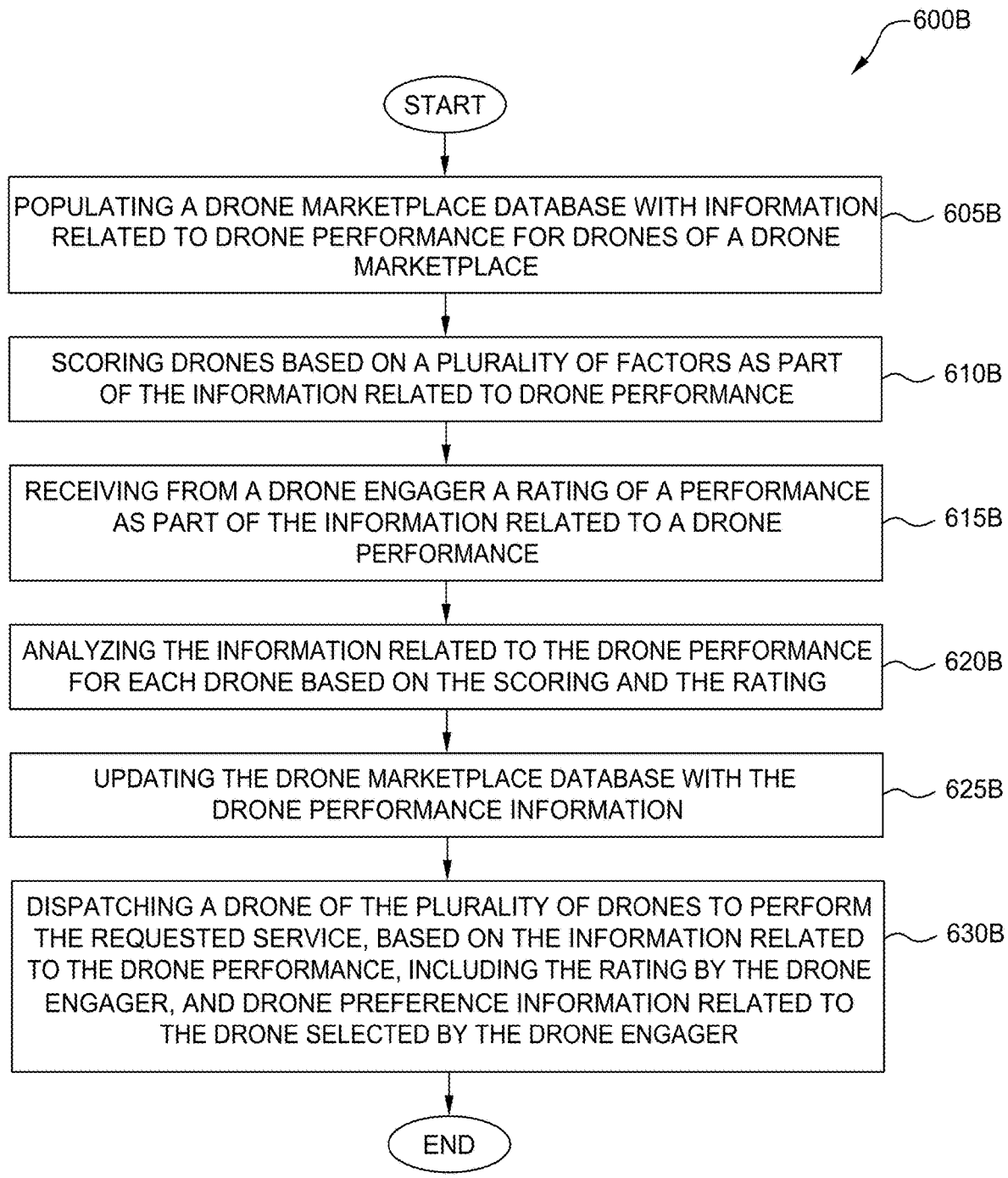
FIG. 6B illustrates a flow for providing UAV services in accordance with at least one embodiment of the present disclosure.

FIG. 6B illustrates a flow 600B for provision of one or more drone services in accordance with at least one embodiment of the present disclosure.

In one embodiment, as with FIG. 6A and as shown in block 605B, a feedback review module 372B (including modules of a feedback review module 372B), in coordination with at least one other component of the drone marketplace system 250 can populate the drone station system database 380 with information about any one of i) the one or more drone users 310, one or more drone administrators 315, and/or one or more drone station administrators 320, ii) information related to drone or drone station performance, where the drone or drone station performance information includes scoring information related to the performance of a first drone in carrying out one or more drone services, where the scoring information is provided by at least one of a drone user 310, drone station administrator 320, or drone administrator 315, and where the scoring information is based on drone user 310, drone station administrator 320, or drone administrator 315 input or review of drone or drone station services under particular conditions, iii) drone data for one or more drones 102, 102n, iv) drone user or engager data for one or more engagers 310, 315, or 320, including preference information for one or more for the engagers v) drone station 136 data for one or more stations that can dispatch and/or service the one or more drones 102, 102n, and vi) in coordination with the external analytics engine 399 (discussed below), weather data, where the weather data includes past weather data, current weather data and weather forecast data. In one embodiment, the populating will include information related to both a user preference and a score related to drone performance.

In one embodiment, as shown in block 610B the drone analytics component 372A provides a scoring for one or more drones 102, 102n of the drone marketplace 250 based on one or more of factors as part of the information related to drone performance and as populated in database 380, where the factor include one or more performance thresholds under one or more circumstances, including weather conditions, time take to provide the services, maintenance requirements, or any other suitable external factor.

In one embodiment, per block 615B, one or more components of the drone marketplace 250, including drone analytics component 372A and feedback review module 372B, receive from at least one drone engager (user, station administrator, or drone administrator) a rating of a performance of at least one of the drones 102, 102n, e.g. a first drone or a selected drone, as part of the information related to drone performance. In one embodiment, the performance information provided by the drone engager can be related to drone performance under specific conditions, e.g. weather conditions, time taken to execute the drone services, maintenance requirements, costs, general satisfaction (and a general rating) or any other suitable information.

In one embodiment per block 620B, drone analytics component 372A analyzes the information related to the drone performance for each of the of drones based on the scoring and the rating. The analytics can be based on either the scoring provided by the drone analytics component in block 610B and/or the rating provided by the drone engager.

In one embodiment, as shown in block 625B, the drone analytics component 372a or other suitable component (e.g. feedback module) of the drone market place 250 will continuously update, the drone marketplace database 250 with the drone performance information.

In one embodiment, per block 630B, the drone dispatcher 377 dispatches a first (or selected) drone of the plurality of drones to perform the requested service, based in whole or in part on the information related to the drone performance, including the rating by the drone engager, and drone preference information related to the drone selected by the drone engager.

Figure 6C:
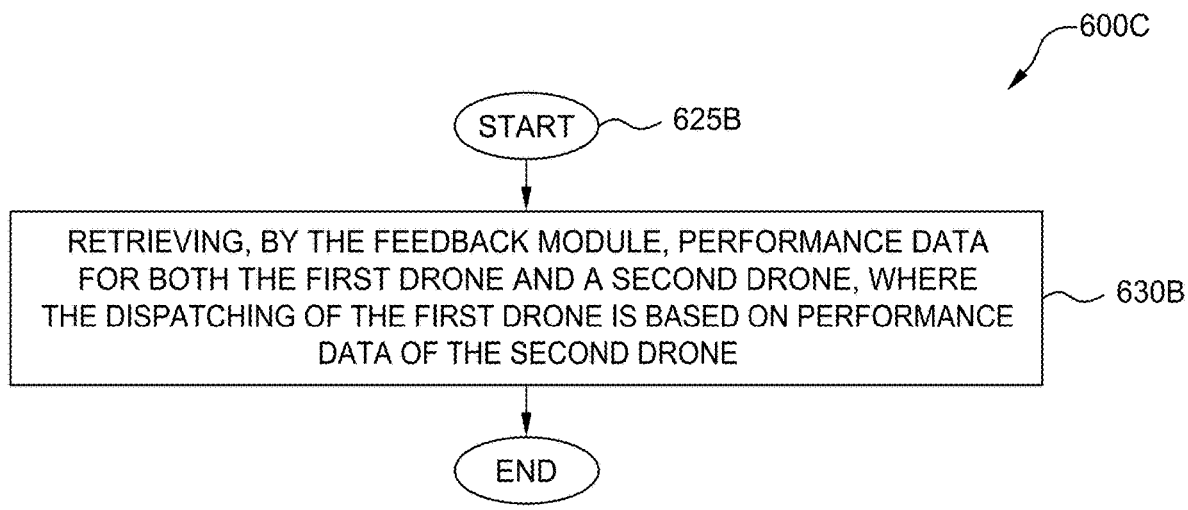
FIG. 6C illustrates a flow for providing UAV services in accordance with at least one embodiment of the present disclosure.

FIG. 6C illustrates flow 600C for provision of one or more drone services in accordance with at least one embodiment of the present disclosure. The flow begins at block 625B. In one embodiment, per block 630B, the feedback module 372B in coordination with an internal module, e.g. drone feeder module 374C, or another module, retrieves performance data for both the first or dispatched drone 102 and second drone 102n from one or more sources, e.g. the drone station system database 380, a drone marketplace system feeder module 120 of a drone 102, etc. and the dispatching of block 625B is based on how a particular to-be-dispatched drone, e.g. 102, or a similar drone 102n provided the same or similar services under the same or similar conditions, e.g. weather conditions, and using the same drone stations, as the user 310 is presented with a score and physical data reflecting the past performance, and the user selects the drone 102 based on the score and physical data reflecting the past performance or the user will designate an automatic selection of the best route based on the computations of the drone analytics drone analytics module 372A. In one embodiment, performance of both drones 102, 102n is under one or more of a substantially similar i) weather condition, ii) user preference in executing a user task, and/or iii) route condition, where the weather condition is reflected in the weather data stored in the drone station system database 380, the user preference is reflected in the drone analytic information stored in the drone station system database 380, and the route condition from the routing information stored in the drone station system database 380.

Figure 6D:
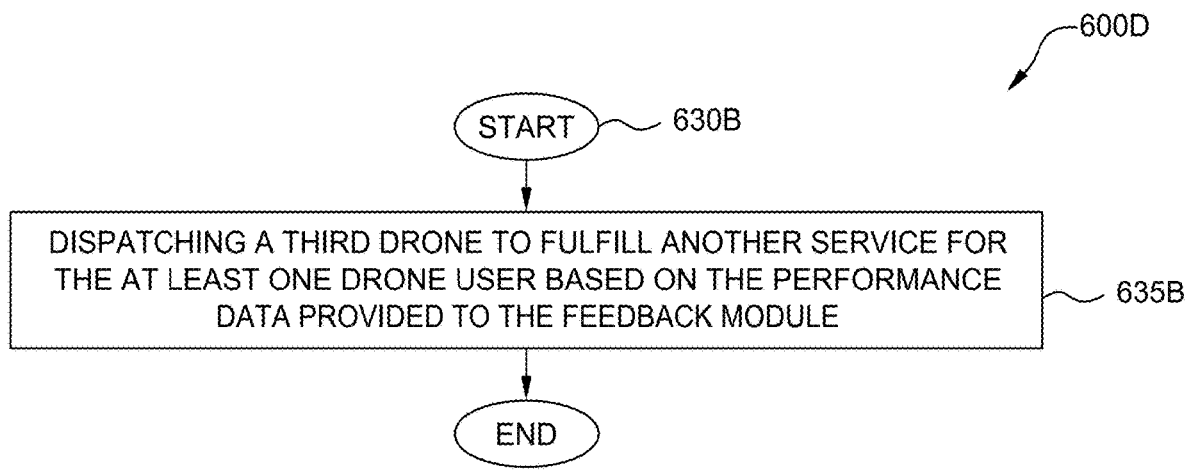
FIG. 6D illustrates a flow for providing UAV services in accordance with at least one embodiment of the present disclosure.

FIG. 6D illustrates a flow 600D for provision of one or more drone services in accordance with at least one embodiment of the present disclosure. The flow begins at block 630B. As shown in block 635B, the dispatcher 377 dispatches a third drone 102n-1 to fulfill another service for the at least one drone user based on the performance data provided to one or more modules of the feedback module 372B. In one embodiment, one or more modules of the feedback module 372B provides the performance data to a drone analytics module 372A to determine the dispatching of another drone, and the drone analytics module coordinates with the external analytics module 399 to take further consideration of information contained in the drone station system database 380, including weather data, which further includes i) a first weather performance data associated with the first drone 102 operating on a first route, ii) a second weather performance data associated with the first drone 102 operating on a second route, iii) a third weather performance data associated with the second drone 102n operating on the first route, and iv) a fourth weather performance data associated with the second drone 102n operating on the second route, where the first route and the second route are each associated with at least one common type of service provided by the first drone and the second drone, and where performance data is based on all of the first weather performance data, the second weather performance data, the third weather performance data, and the fourth weather performance data.

In one embodiment, the first performance weather data and third weather performance data are based on substantially similar weather conditions, the second performance weather data and fourth weather performance data are based on substantially similar weather conditions, and the first drone and the second drone have distinct physical attributes in relation to one another. This enables the drone analytics component 372A to provide an objective score on how each drone performs under similar conditions for a particular service, and how a similar drone will likely perform for providing a particular service under those conditions. As such, the assessments of the drone analytics component 372A can be passed on to a user 310 via a suitable interface 360A, such that the user can make an appropriate selection for a drone to perform a particular service along a route.

Figure 7:
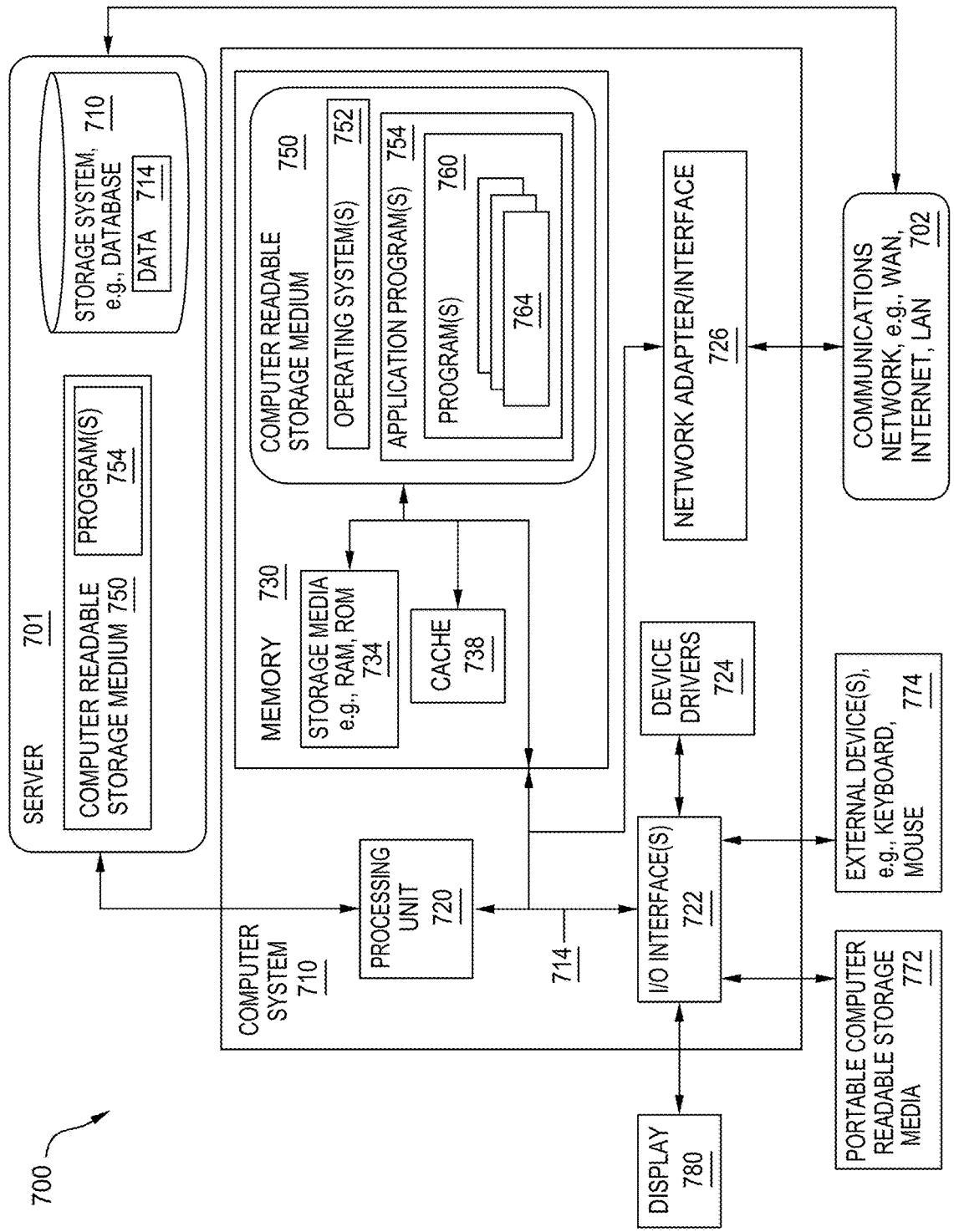
FIG. 7 illustrates an exemplary computer device and cloud computing node in accordance with at least one embodiment of the present disclosure.

FIG. 7 illustrates the computer system 700 that can execute one or more flows of the present disclosure, including the flows of FIGS. 6A, 6B, 6C, and 6D. The components of the computer 710 may include, but are not limited to, one or more processors or processing units 720, a system memory 730, and a bus 1014 that couples various system components including system memory 730 to processor 720.

The bus 714 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 710 typically includes a variety of computer readable media. Such media may be any available media that is accessible by the computer 710 (e.g., computer system, or server), and can include both volatile and non-volatile media, as well as, removable and non-removable media.

Computer memory 730 can include additional computer readable storage media 734 in the form of volatile memory, such as random access memory (RAM) and/or cache memory 738. The computer 710 may further include other removable/non-removable, volatile/non-volatile computer storage media, in one example, portable computer readable storage media 772. In one embodiment, a computer readable storage medium 750 can be provided for reading from and writing to a non-removable, non-volatile magnetic media. The computer readable storage medium 750 can be embodied, for example, as a hard drive. Additional memory and data storage can be provided, for example, as a storage system 744 (e.g., a database) for storing data 748 and communicating with the processing unit 720. The database can be stored on or part of a server 740. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 714 by one or more data media interfaces. As will be further depicted and described below, memory 730 may include at least one program product which can include one or more program modules that are configured to carry out the functions of embodiments of the present disclosure.

One or more computer programs can generically be referred to as a program 760. The program 760 can include program modules 764, and may be stored in memory 730. By way of example, the memory 730 may store an operating system 752, an application program 754, other program modules, and program data. The program modules 764 can generally carry out functions and/or methodologies of embodiments of the present disclosure as described herein, including flows 600A, 600B, and 600C. The one or more programs 760 are stored in memory 730 and are executable by the processing unit 720. It is understood that the operating system 752 and application program 754 stored on the computer readable storage medium 750 are similarly executable by the processing unit 720.

The computer 710 may also communicate with one or more external devices 774 such as a keyboard, a pointing device, a display 780, etc.; one or more devices that enable a user to interact with the computer 710; and/or any devices (e.g., network card, modem, etc.) that enables the computer 710 to communicate with one or more other computing devices. Such communication can occur via Input/Output (I/O) interfaces 722. Still yet, the computer 710 can communicate with one or more networks 702 such as a local area network (LAN), a general wide area network (WAN), and/or a public network (e.g., the Internet) via network adapter/interface 726. As depicted, network adapter 726 communicates with the other components of the computer 710 via bus 714. It should be understood that although not shown, other hardware and/or software components could be used in conjunction with the computer 710. Examples, include, but are not limited to: microcode, device drivers 724, redundant processing units, and external disk drive arrays, RAID systems, tape drives, and data archival storage systems, etc.

The flows of the present disclosure, e.g. 600A (FIG. 6A) may be embodied in a program 760 (FIG. 7) embodied on a computer readable storage device, for example, generally referred to as memory 730, and can more specifically refer to computer readable storage medium 750, as shown in FIG. 7. The program 760 is executable by the processor 720 of the computer system 710 (to execute program steps, code, or program code). Additional data storage may also be embodied as the database 744 which includes data 748. The program or executable instructions may be offered as a service by a provider. The computer 710 and program 760 shown in FIG. 7 are generic representations of a computer and program that may be local to a user, or provided as a remote service (for example a cloud based service), and may be provided in further examples, using a website accessible using a network 702 (e.g., interacting with a network, the Internet, or cloud services). It is understood that the computer 710 and computer system 700 also generically represents herein a computer device or a computer included in a device, such as a laptop or desktop computer, etc., or one or more servers, alone or as part of a datacenter. The computer and computer system can include the network adapter/interface 726, and the input/output (I/O) interface(s) 722. The I/O interface 722 allows for input and output of data with an external device 774 that may be connected to the computer system. The network adapter/interface 726 may provide communications between the computer system and a computer network generically shown as the network 702. The method steps and system components and techniques may be embodied in modules of the program 760 for performing the tasks of each of the steps of the method and system, which are generically represented in FIG. 6A, FIG. 6B, and FIG. 6C as program modules 764. The program 760 and program modules 764 can execute specific steps, routines, sub-routines, instructions or code, of the program. The method of the present disclosure can be run locally on a device such as a mobile device, or can be run a service, for instance, on the server 740 which may be remote and can be accessed using the communications network 702.

It is understood that a computer or a program running on the computer 710 may communicate with a server, herein embodied as the server 740, via one or more communications networks, herein embodied as the network 702. The communications network 702 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer, including a mobile device, can use a communications system or network 702 which can include the Internet, or a public switched telephone network (PSTN), for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MIMS) (related to SMS), email, or a web browser. The search engine can retrieve search results, that is, links to websites, documents, or other downloadable data that correspond to the query, and similarly, provide the search results to the user via the device as, for example, a web page of search results.

It should be understood that the words "alert," "status" and "progress" are used loosely and are not intended to suggest any limitation as to the scope of use or functionality of embodiments of the present principles described herein. For example, "alert," "status" and/or "progress" may refer to, but are not limited to, a level of task completion of one or more deliveries, an amount of time associated with a delivery, a level of turbulence experienced during a delivery, an indication of temperatures traversed during delivery, a level of gravitational force and/or tilt experienced during delivery, a value associated with the items for delivery, etc. It should also be understood that the word "flight" is used loosely and is not intended to suggest any limitation. For example, "flight" may refer to, but is not limited to, any stage during the delivery of an item, such as when the drone has landed.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software service, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In one or more embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure, including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
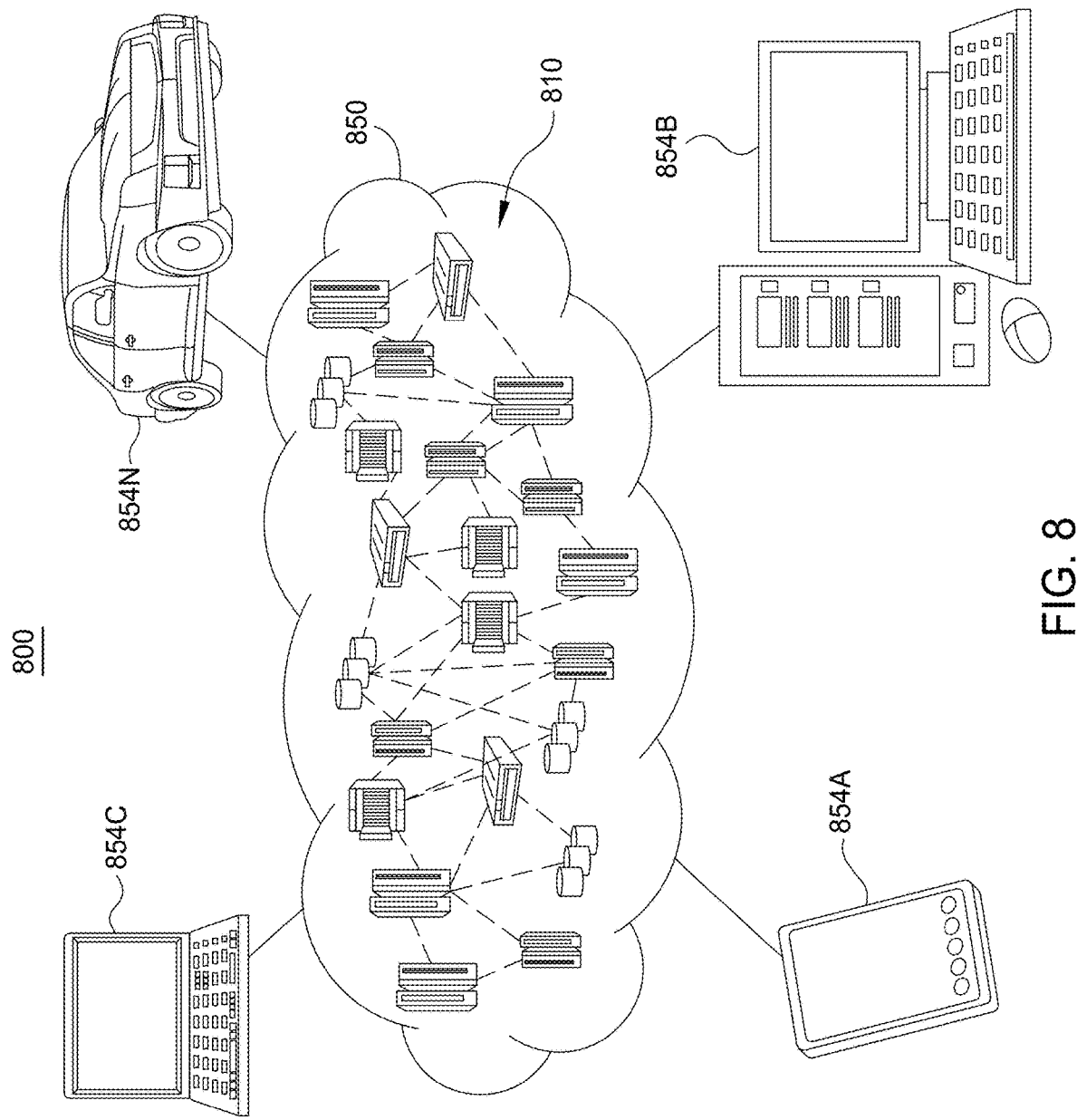
FIG. 8 illustrates an exemplary cloud computing environment in accordance with at least one embodiment of the present disclosure.

Referring now to FIG. 8, illustrative cloud computing environment 850 is depicted. As shown, cloud computing environment 850 includes one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
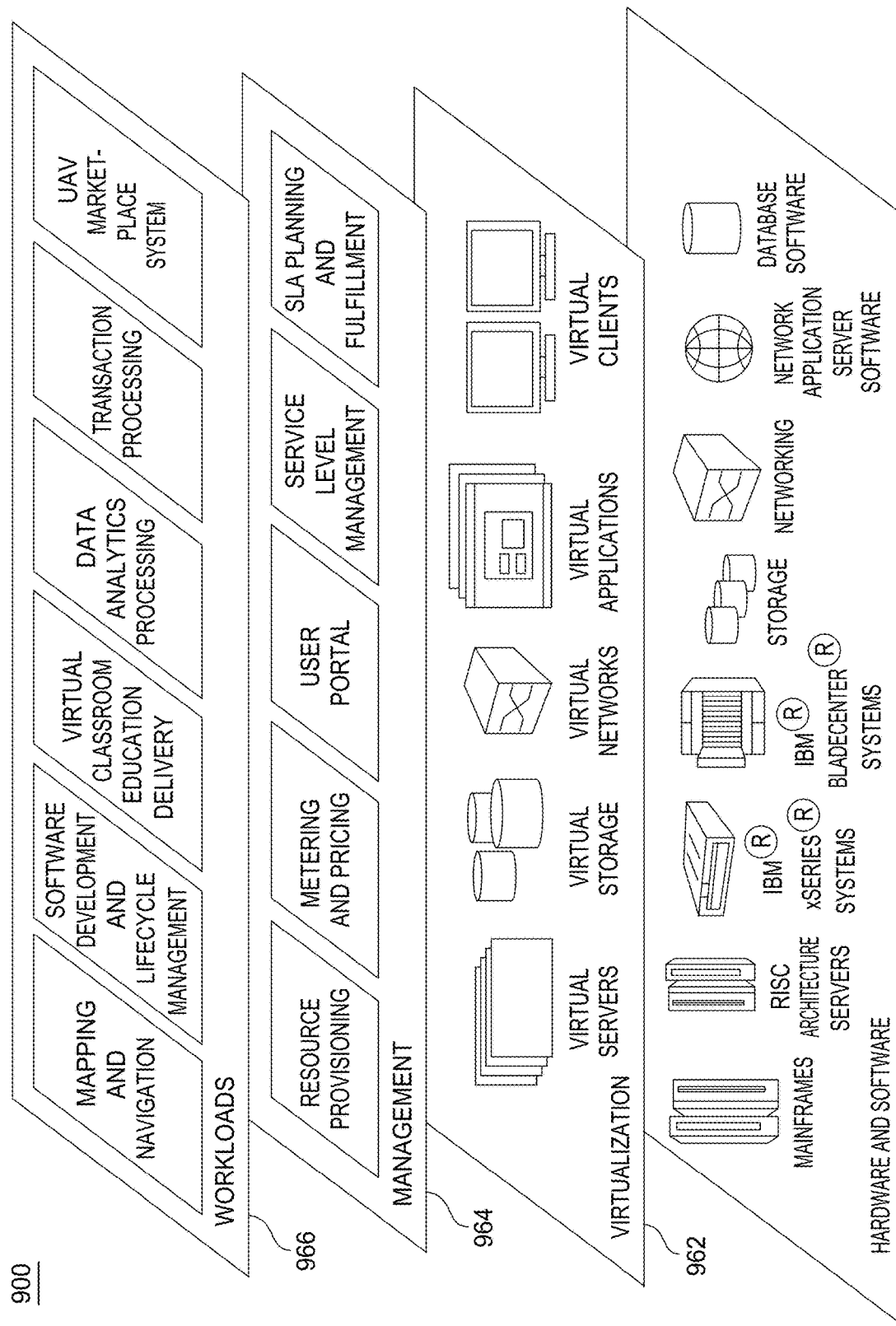
FIG. 9 illustrates exemplary abstraction model layers in accordance with at least one embodiment of the present disclosure.

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the invention are not limited thereto. As depicted, the following layers and corresponding functions are provided: Hardware and software layer 960 includes hardware and software components. Examples of hardware components include: mainframes 61; RISC (Reduced Instruction Set Computer) architecture based servers 962; servers 963; blade servers 964; storage devices 965; and networks and networking components 966.

In some embodiments, software components include network application server software 967 and database software 968. Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators. Service level management 84 provides cloud computing resource allocation and management such that required service levels are met.

Service Level Agreement (SLA) planning and fulfillment 985 provides pre-arrangement for, and procurement of, cloud computing resources for which a future requirement is anticipated in accordance with an SLA. Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and drone marketplace access, provisioning, interfacing and storage 996.

While the foregoing is directed to embodiments of the present invention, other and further embodiments of the invention may be devised without departing from the basic scope thereof, and the scope thereof is determined by the claims that follow.

What is claimed is:

1. A computer-implemented method for using a drone station marketplace, the computer-implemented method comprising:

populating a drone marketplace database for a drone marketplace using one or more feedback modules with information related to drone performance for a plurality of drones as part of the drone marketplace, the information related to the drone performance including preference information from a plurality of drone engagers;

receiving a rating of a performance of at least one of the plurality of drones as part of the information related to drone performance from the plurality of drone engagers;

scoring the plurality of drones of the drone marketplace based on a plurality of factors as part of the information related to drone performance, the factors including performance thresholds;

receiving a request for a drone service from a drone engager of the plurality of drone engagers, wherein the request includes preference information of the drone engager;

analyzing the preference information and the information related to drone performance for each of the plurality of drones;

continuously updating, with the one or more feedback modules, the drone marketplace database with the drone performance information, wherein the drone performance information comprises data received from a data collection device at a drone of the plurality of drones; and dispatching a first drone of the plurality of drones to perform the requested service, based on the information related to the drone performance, including the scoring of the plurality of drone and the rating by the plurality of drone engagers, and the drone preference information of the plurality drone engagers.

2. The method according to claim 1, wherein the plurality of drone engagers are registered in a registry for the drone marketplace.

3. The method according to claim 1, wherein the plurality of drone engagers is selected from a group consisting of: i) drone users, ii) drone administrators, and iii) drone station administrators, and the method further comprises:

sending drone flight status information for the first drone to a corresponding drone controller and corresponding drone station.

4. The method according to claim 1, wherein the performance information includes drone data, wherein the drone data includes performance information related to a performance of a second drone of the plurality of drones, and wherein the drone service selection and dispatching of the first drone is based on the performance data of the second drone.

5. The method according to claim 4, wherein the drone data further includes: weather data, wherein the weather data includes past weather data, current weather data and weather forecast data, wherein both the first drone and the second drone share a common drone station, and the method further comprises:

retrieving, by the one or more feedback modules, the performance data for both the first drone and the second drone, and wherein the performance data from at least one of the first drone and the second drone includes real time data with respect to a performance of the first drone and the second drone i) at a particular location, ii) under a particular temperature range, iii) with a certain weight load attached to the at least one of the first drone and the second drone, and iv) a speed range achieved by the at least one of the first drone and the second drone at the location, with the certain weight load, and under the particular temperature range.

6. The method according to claim 4, the method further comprising: continuously updating routing information received from a route calculation module, wherein both the first drone and the second drone share a drone station; retrieving, by the one or more feedback modules, the performance data for both the first drone and the second drone, wherein the received request is from at least one of the drone engagers, and the drone data includes performance data for both the first drone and the second drone under a substantially similar factor selected from the group consisting of i) substantially similar weather condition, ii) substantially similar user preference in executing a user task, and iii) a substantially similar route condition, wherein the weather condition is reflected in the weather data, the user preference is reflected in the drone analytic information, and the route condition is reflected from the routing information.

7. The method according to claim 6 further comprising: dispatching a third drone to fulfill another service for another one of the plurality drone engagers based on the performance data provided to the one or more feedback modules.

8. The method according to claim 7, wherein the one or more feedback modules provide the drone data to a drone analytics module to determine the dispatching of the third drone, and wherein the weather data further includes i) a first weather performance data associated with the first drone operating on a first route, ii) a second weather performance data associated with the first drone operating on a second route, iii) a third weather performance data associated with the second drone operating on the first route, and iv) a fourth weather performance data associated with the second drone operating on the second route, wherein the first route and the second route are each associated with at least one common type of service provided by the first drone and the second drone, and wherein the drone data is based in part on all of the first weather performance data, the second weather performance data, the third weather performance data, and the fourth weather performance data.

9. The method according to claim 8, wherein the first performance weather data and third weather performance data are based on substantially similar weather conditions, wherein the second performance weather data and fourth weather performance data are based on substantially similar weather conditions, and wherein the first drone and the second drone have distinct physical attributes in relation to one another.

10. A drone marketplace system place comprising: a processor;

a plurality of interfaces each for displaying at least one drone feature associated with one or more drones to a drone user, and a memory comprising instructions which, when executed on the processor, performs an operation, the operation comprising:

populating a drone marketplace database for a drone marketplace using one or more feedback modules with information related to drone performance for a plurality of drones as part of the drone marketplace, the information related to the drone performance including preference information from a plurality of drone engagers;

receiving a rating of a performance of at least one of the plurality of drones as part of the information related to drone performance from the plurality of drone engagers;

scoring the plurality of drones of the drone marketplace based on a plurality of factors as part of the information related to drone performance, the factors including performance thresholds;

determining a performance level of the one or more drones providing one or more services along at least one route under one or more external conditions, wherein the performance level of the one or more drones is determined using data received from a data collection device at a drone of the one or more drones;

displaying, via a first interface of the plurality of interfaces, one or more results of the determined performance level of the one or more drones in providing the one or more services to the drone user;

receiving a request for a drone service from a drone engager of a plurality of drone engagers, wherein the request includes preference information of the drone engager;

analyzing the preference information and the determined performance level of the one or more drones; and dispatching a first drone of the one or more of drones to perform the requested service, based on the information related to a drone performance level, including a scoring of the plurality of drones, a rating by the plurality of drone engagers, and drone preference information from the plurality drone engagers.

11. The drone marketplace system according to claim 10, wherein the plurality of interfaces further includes:

a drone station interface for selecting, by the drone user, the one or more drones from a first drone station.

12. The drone marketplace system according to claim 11 further comprising at least one of:

a drone service interface for selecting, by the user, at least one service provided by the one or more drones; and a drone station interface for selecting, by the user, at least one drone station associated with the one or more drones.

13. The drone marketplace system according to claim 12, wherein the drone service interface includes a plurality of distinct drone services selectable by the user.

14. The drone marketplace system according to claim 12, wherein the plurality of drone interfaces includes:

a drone station interface for selecting, by the user, the one or more drones from one or more drone stations; and a drone service interface for selecting, by the user, at least one service provided by the one or more drones, wherein the operation further comprises:

determining the performance level of the one or more drones in providing the one or more services.

15. A computer program product for utilizing one or more drone functionalities, the computer program product comprising:

a computer-readable storage medium having computer-readable program code embodied therewith, the computer-readable program code executable by one or more computer processors to:

populate a drone marketplace database for a drone marketplace using one or more feedback modules with information related to drone performance for a plurality of drones as part of the drone marketplace, the information related to the drone performance including preference information from a plurality of drone engagers;

receive a rating of a performance of at least one of the plurality of drones as part of the information related to drone performance from the plurality of drone engagers;

score the plurality of drones of the drone marketplace based on a plurality of factors as part of the information related to drone performance, the factors including performance thresholds;

receive a request for a drone service from a drone engager of the plurality of drone engagers, wherein the request includes preference information of the drone engager;

analyze the preference information and the information related to drone performance for each of the plurality of drones;

continuously update, with the one or more feedback modules, the drone marketplace database with the drone performance information, wherein the drone performance information comprises data received from a data collection device at a drone of the plurality of drones; and dispatch a first drone of the plurality of drones to perform the requested service, based on the information related to the drone performance, including the scoring of the plurality of drone and the rating by the plurality of drone engagers, and the drone preference information of the plurality drone engagers.

16. The computer program product according to claim 15, wherein the performance information includes drone data, wherein the drone data includes performance information related to a performance of a second drone of the plurality of drones, and wherein the drone service selection and dispatching of the first drone is based on the performance data of the second drone.

17. The computer program product of claim 16, wherein the drone data further includes: weather data, wherein the weather data includes past weather data, current weather data and weather forecast data, wherein both the first drone and the second drone share a common drone station, and wherein the computer-readable code is further executable:

retrieve, by the one or more feedback modules, the performance data for both the first drone and the second drone, and wherein the performance data from at least one of the first drone and the second drone includes real time data with respect to a performance of the first drone and the second drone i) at a particular location, ii) under a particular temperature range, iii) with a certain weight load attached to the at least one of the first drone and the second drone, and iv) a speed range achieved by the at least one of the first drone and the second drone at the location, with the certain weight load, and under the particular temperature range.

18. The computer program product according to claim 16, wherein the performance information further includes: i) drone station data and ii) weather data, wherein the weather data includes past weather data, current weather data and weather forecast data, wherein both the dispatched drone and the second drone share a drone station, and wherein the computer-readable code is further executable to:

retrieve, by the one or more feedback modules, the performance data for both the dispatched drone and the second drone, and wherein the performance data from at least one of the selected drone and the second drone includes real time data with respect to a performance of at least one of the dispatched drone and the second drone i) at a particular location, ii) under a particular temperature range, iii) with a certain weight load attached to the at least one of the first drone and the second drone, and iv) a speed range achieved by the at least one of the first drone and the second drone at the location, with the certain weight load, and under the particular temperature range.

19. The computer program product according to claim 16, wherein both the first drone and the second drone share a drone station, and wherein the computer-readable code is further executable to:

continuously update routing information received from a route calculation module, wherein both the first drone and the second drone share a drone station;

retrieve, by the one or more feedback modules, the performance data for both the first drone and the second drone, wherein the received request is from at least one of the drone engagers, and the drone data includes performance data for both the first drone and the second drone under a substantially similar factor selected from the group consisting of i) substantially similar weather condition, ii) substantially similar user preference in executing a user task, and iii) a substantially similar route condition, wherein the weather condition is reflected in the weather data, the user preference is reflected in the drone analytic information, and the route condition is reflected from the routing information.

20. The computer program product according to claim 19, the computer-readable program code is further executable to:

dispatch a third drone to fulfill another service for another one of the plurality of drone engagers based on the performance data provided to the one or more feedback modules, wherein the one or more feedback modules provide the drone data to a drone analytics module to determine the dispatching of the third drone, and wherein the weather data further includes i) a first weather performance data associated with the first drone operating on a first route, ii) a second weather performance data associated with the first drone operating on a second route, iii) a third weather performance data associated with the second drone operating on the first route, and iv) a fourth weather performance data associated with the second drone operating on the second route, wherein the first route and the second route are each associated with at least one common type of service provided by the first drone and the second drone, and wherein the drone data is based in part on all of the first weather performance data, the second weather performance data, the third weather performance data, and the fourth weather performance data.

* * * * *